(12) United States Patent
Hilti et al.

(10) Patent No.: US 6,310,128 B1
(45) Date of Patent: *Oct. 30, 2001

(54) HALOGEN-CONTAINING POLYMERS PROVIDED WITH AN ANTISTATIC AGENT

(75) Inventors: Bruno Hilti, Basel; Ernst Minder, Sissach; Jürgen Pfeiffer, Reinach; Rolf Drewes, Lindenfels, all of (CH)

(73) Assignee: Witco Vinyl Additives GmbH, Lampertheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/668,890

(22) Filed: Jun. 24, 1996

(30) Foreign Application Priority Data

Jun. 28, 1995 (CH) .................................................. 1900/95

(51) Int. Cl.$^7$ ......................................................... C08J 5/06
(52) U.S. Cl. ............................................................. 524/378
(58) Field of Search ............................................... 524/378

(56) References Cited

U.S. PATENT DOCUMENTS

| | | | |
|---|---|---|---|
| 4,529,539 | 7/1985 | Monma et al. | 252/518 |
| 5,334,635 | 8/1994 | Udipi | 524/377 |

FOREIGN PATENT DOCUMENTS

| | | |
|---|---|---|
| 261359 | 11/1986 | (JP) . |
| 90242 | 4/1989 | (JP) . |
| 8601521 | 3/1986 | (WO) . |

OTHER PUBLICATIONS

Derw. Abst 89–147435 [20] of JP 01–090–242.
Derw. Abst 87–002622 of JP 61–261–359.

*Primary Examiner*—Peter D. Mulcahy
(74) *Attorney, Agent, or Firm*—Scully, Scott, Murphy & Presser

(57) ABSTRACT

A polyoxyalkylene compound and an inorganic salt are used to reduce the tendency of halogen-containing polymers to build up electrostatic charge and at the same time to achieve good stability.

16 Claims, No Drawings

HALOGEN-CONTAINING POLYMERS PROVIDED WITH AN ANTISTATIC AGENT

The invention relates to halogen-containing polymers, preferably polyvinyl chloride (PVC), which have been provided with an antistatic agent, to an additive mixture comprising a polyoxyalkylene and an inorganic salt, and to a process for the preparation of antistatic halogen-containing polymers.

A disadvantage of many polymers and thus also of halogen-containing polymers is their ready electrostatic chargeability; once charges are present, they cannot be dissipated quickly enough owing to the low conductivity. However, in addition to aesthetic reasons, safety aspects frequently require rapid charge dissipation. Examples of problems and hazards which may be mentioned are the following: soiling of polymer surfaces, charging of persons on contact with polymers, production faults due to film webs sticking together, clumping of polymer powders and sparking due to strong charging with subsequent ignition of dust or solvent/air mixtures, which repeatedly results in violent explosions.

Static charging is frequently countered using substances which improve the surface conductivity. However, these substances have the disadvantage of being virtually ineffective at low atmospheric humidity levels, which is why substances are then considered which increase the volume conductivity. However, the known substances for increasing the volume conductivity, for example carbon black or metal powders, adversely affect the mechanical properties of the polymers and cannot be used for transparent polymers. In addition, the requirement for additives to be ecologically acceptable is increasing in frequency.

Further information on antistatic additives and the mechanism of static charging is given, for example, in "Plastics Additives Handbook", edited by R. Gächter and H. Müller, Hanser Verlag, 3rd Edition, 1990, pages 749–775.

There thus continues to be a demand for an antistatic additive system which simultaneously enables high thermal stabilization. In particular, there is a desire for ecologically acceptable additive systems which are effective even at low atmospheric humidity levels and thus increase, in particular, the volume conductivity of the polymer. It has now been found that certain polyoxyalkylenes in combination with a selected inorganic salt impart an excellent antistatic action and good thermal stability on a halogen-containing polymer.

The invention thus relates to a composition comprising
(a) a halogen-containing polymer,
(b) a polyoxyalkylene of the formula
   $R_1$—O—[CH($R_3$)—CH$_2$—O—]$_n$—[CH$_2$—[CH(OH)]$_p$—CH$_2$—O]$_q$—[C(O)]$_r$—$R_2$ (I), where
   $R_1$ is H, $C_1$–$C_{24}$alkyl, $C_2$–$C_{24}$alkenyl, CH$_2$=CH—C(O) or CH$_2$=CCH$_3$—C(O),
   $R_2$ is $C_1$–$C_{24}$alkyl, $C_2$–$C_{24}$alkenyl, CH$_2$—COOH, or N($C_1$–$C_8$alkyl)$_3$Hal,
   $R_3$ is H or CH$_3$,
   Hal is Cl, Br or I,
   n is a number greater than or equal to 2,
   p is a number from 1 to 6, and q and r, independently of one another, are 0 or 1; and
(c) an inorganic salt of the formula $\{M^{z+}{}_a A^{(aZ/b)-}{}_b\}$, where
   M is a z-valent alkali metal cation, alkaline earth metal cation or zinc cation,
   a and b, independently of one another, are a number from 1 to 6, and
   A is an anion of an inorganic protic acid or of an organic oxo acid of sulfur;

where the composition contains no ammonium perchlorate.

The halogen-containing polymers are preferably chlorine-containing polymers, for example polymers of vinyl chloride, vinyl resins containing vinyl chloride units in their structure, such as copolymers of vinyl chloride and vinyl esters of aliphatic acids, in particular vinyl acetate, copolymers of vinyl chloride with esters of acrylic and methacrylic acid and with acrylonitrile, copolymers of vinyl chloride with diene compounds and unsaturated dicarboxylic acids or anhydrides thereof, such as copolymers of vinyl chloride with diethyl maleate, diethyl fumarate or maleic anhydride, postchlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerizable compounds; polymers of vinyl chloroacetate and dichlorodivinyl ethers; chlorinated polymers of vinyl acetate, chlorinated polymeric esters of acrylic acid and of alpha-substituted acrylic acid; polymers of chlorinated styrenes, for example dichlorostyrene; chlorinated rubbers; chlorinated polymers of ethylene; polyvinyl dichloride; polymers and postchlorinated polymers of chlorobutadiene and copolymers thereof with vinyl chloride, rubber hydrochloride and chlorinated rubber hydrochloride; and mixtures of said polymers with one another or with other polymerizable compounds.

Also included are the graft polymers of PVC with EVA, ABS and MBS. Preferred substrates also include mixtures of the abovementioned homopolymers and copolymers, in particular vinyl chloride homopolymers, with other thermoplastic and/or elastomeric polymers, in particular blends with ABS, MBS, NBR, SAN, EVA, CPE, MBAS, PMA, PMMA, EPDM and polylactones.

Preference is furthermore given to suspension polymers, bulk polymers and emulsion polymers.

A particularly preferred chlorine-containing polymer is polyvinyl chloride, in particular suspension polymer or bulk polymer.

For the purposes of this invention, PVC is also taken to mean copolymers or graft polymers of PVC with polymerizable compounds, such as acrylonitrile, vinyl acetate or ABS, it being possible for these to be suspension, bulk or emulsion polymers. Preference is given to PVC homopolymer, also in combination with polyacrylates.

The polyoxyalkylenes of the formula
   $R_1$—O—[CH($R_3$)—CH$_2$—O—]$_n$—[CH$_2$—[CH(OH)]$_p$—CH$_2$—O]$_q$—[C(O)]$_r$—$R_2$ (I), where
   $R_1$ is H, $C_1$–$C_{24}$alkyl, $C_2$–$C_{24}$alkenyl, CH$_2$=CH—C(O) or CH$_2$=CCH$_3$—C(O),
   $R_2$ is $C_1$–$C_{24}$alkyl, $C_2$–$C_{24}$alkenyl, CH$_2$—COOH, or N($C_1$–$C_8$alkyl)$_3$Hal,
   $R_3$ is H or CH$_3$,
   Hal is Cl, Br or I,
   n is a number greater than or equal to 2,
   p is a number from 1 to 6, and
   q and r, independently of one another, are 0 or 1,
which can be used in accordance with the invention as component (b) are known in general terms.

Any $C_1$–$C_{24}$alkyl substituents in the compounds of the formula (I) can be radicals such as methyl, ethyl, propyl, butyl, pentyl, hexyl, heptyl, octyl, nonyl, decyl, undecyl, dodecyl, tetradecyl, hexadecyl, octadecyl, eicosyl, docosyl and tetracosyl and corresponding branched isomers.

Any $C_1$–$C_{24}$alkenyl substituents in the compounds of the formula (I) are derived from the abovementioned alkyl radicals, the double bond preferably being arranged in the centre of the carbon chain. The preferred alkenyl radicals is oleyl. If r is 1, alkenyl $R_2$ is preferably also $CH_2=CH-$ or $CH_2=CCH_3-$.

In the compounds of the formula (I), $R_1$ is preferably H or $C_1-C_4$alkyl, very particularly preferably H.

In the compounds of the formula (I), $R_2$ is preferably $C_6-C_{20}$alkyl, $C_6-C_{20}$alkenyl or $N(C_1-C_8alkyl)_3Cl$, very particularly preferably $C_6-C_{20}$alkyl or $C_6-C_{20}$alkenyl.

In the compounds of the formula (I), Hal is preferably Cl.

In the compounds of the formula (I), n is preferably a number from 2 to 20, very particularly preferably a number from 2 to 14.

In the compounds of the formula (I), p is preferably a number from 2 to 6, very particularly preferably the number 4.

In the compounds of the formula (I), q is preferably the number 0 or 1, very particularly preferably the number 0 and r is preferably the number 1.

Particular preference is given to the polypropylene glycol lauryl ester, polypropylene glycol oleyl ester, polypropylene glycol methyldiethylammonium chloride, polyethylene glycol monomethyl ether, polyethylene glycol dimethyl ether, polyethylene glycol lauryl ester, polyethylene glycol oleyl ester, polyethylene glycol oleyl ether, polyethylene glycol sorbitan monolauryl ester, polyethylene glycol stearyl ester, polyethylene glycol polypropylene glycol lauryl ether and polyethylene glycol lauryl ether carboxylic acid. Very particular preference is given to polyethylene glycol oleyl ether and especially to polyethylene glycol lauryl ester.

Very particular preference is given to compounds of the formula (I) in which $R_1$ is H, $R_2$ is $C_6-C_{20}$alkyl or $C_6-C_{20}$alkenyl, $R_3$ is H or $CH_3$, n is a number from 2 to 14, q is zero r is one.

The compound of the formula (I) which can be used in accordance with the invention as component (b) can be employed in an amount of, for example, from 0.1 to 50 parts by weight, preferably from 0.1 to 30 parts by weight, particularly preferably from 0.1 to 20 parts by weight, based on 100 parts by weight of halogen-containing polymer.

The inorganic salts of the formula $\{M^{z+}{}_a A^{(az/b)-}{}_b\}$, where M is a z-valent alkali metal cation, alkaline earth metal cation or zinc cation, a and b, independently of one another, are a number from 1 to 6, A is an anion of an inorganic protic acid or of an organic oxo acid of sulfur, which can be used in accordance with the invention as component (c) are known in general terms.

An alkali metal cation, alkaline earth metal cation or zinc cation M is preferably derived from the metals Li, Na, K, Cs, Ca, Mg, Sr, Ba and Zn. In particular, M is derived from metals Li, Na, K, Ca, Mg and Zn.

A is the anion of an inorganic protic acid or of an organic oxo acid of sulfur, this also including acids which do not exist in free form, but only exist in the form of their salts. A is preferably derived from acids from the group consisting of inorganic oxo acids, inorganic complex acids and organic oxo acids of sulfur. Examples which may be mentioned are the following anions: perchlorate, hexafluorophosphate, trifluoromethylsulfonate, tetrafluoroborate and perfluorobutylsulfonate.

Component (c) is particularly preferably an inorganic salt selected from the group consisting of $LiClO_4$, $LiCF_3SO_3$, $NaClO_4$, $NaCF_3SO_3$, $KClO_4$, $KPF_6$, $KCF_3SO_3$, $KC_4F_9SO_3$, $CaClO_4$, $CaPF_6$, $CaCF_3SO_3$, $Mg(ClO_4)_2$, $Mg(CF_3SO_3)_2$, $ZnClO_4$, $ZnPF_6$ and $CaCF_3SO_3$.

The inorganic salt (c) in the composition is very particularly preferably $NaClO_4$ or $KPF_6$.

The inorganic salt which can be used in accordance with the invention as component (c) can be employed in an amount of, for example, less than 10 parts by weight, preferably less than 5 parts by weight, particularly preferably from 0.01 to 3 parts by weight, based on 100 parts by weight of halogen-containing polymer.

In a preferred embodiment of the invention, the weight ratio between component (b) and (c) is from 1:1 to 100:1.

The halogen-containing polymer is preferably a flexible halogen-containing polymer. In accordance with ASTM D 883-93, flexible polymers are regarded as being those which have a modulus of elasticity of less than 700 MPa at 23° C. and 50% relative humidity, the measurements being carried out as described in ASTM D 747, D 638 or D 882 (1993). Flexible halogen-containing polymers usually contain one or more plasticizers. Industrially important plasticizers are organic plasticizers.

Flexible halogen-containing polymers are furthermore defined as being suitable, as a consequence of their plasticizer content, for the production of flexible halogen-containing polymer articles. These include, for example, cable and wire sheathing, roof sheeting, decorative films, foams, agricultural sheeting, office foils, automotive films (including those with polyurethane foam backing), tubes, sealing profiles and the like.

Examples of suitable organic plasticizers are those from the following groups:

A) Phthalates (esters of phthalic acid)

Examples of these plasticizers are dimethyl, diethyl, dibutyl, dihexyl, di-2-ethylhexyl, di-n-octyl, diisooctyl, diisononyl, diisodecyl, diisotridecyl, dicyclohexyl, dimethylcyclohexyl, dimethyl glycol, dibutyl glycol, benzyl butyl and diphenyl phthalate, and mixtures of phthalates, such as $C_7-C_9$- and $C_9-C_{11}$alkyl phthalates made from predominantly linear alcohols, $C_6-C_{10}$-n-alkyl phthalates and $C_8-C_{10}$-n-alkyl phthalates. Preference is given to dibutyl, dihexyl, di-2-ethylhexyl, di-n-octyl, diisooctyl, diisononyl, diisodecyl, diisotridecyl and benzyl butyl phthalate, and said mixtures of alkyl phthalates. Particular preference is given to di-2-ethylhexyl, dioctyl, diisononyl and diisodecyl phthalate. The abbreviations DOP (dioctyl phthalate, di-2-ethylhexyl phthalate), DINP (diisononyl phthalate) and DIDP (diisodecyl phthalate) are customary.

B) Esters of aliphatic dicarboxylic acids, in particular esters of adipic, azelaic and sebacic acids.

Examples of these plasticizers are di-2-ethylhexyl adipate, di-isooctyl adipate (mixture), di-isononyl adipate (mixture), di-isodecyl adipate (mixture), benzyl butyl adipate, benzyl octyl adipate, di-2-ethylhexyl azelate, di-2-ethylhexyl sebacate and di-isodecyl sebacate (mixture). Preference is given to di-2-ethylhexyl adipate and di-isooctyl adipate.

C) Esters of trimellitic acid, for example tri-2-ethylhexyl trimellitate, tri-isodecyl trimellitate (mixture), tri-isotridecyl trimellitate, tri-isooctyl trimellitate (mixture) and tri-$C_6-C_8$alkyl, tri-$C_6-C_{10}$alkyl, tri-$C_7-C_9$alkyl and tri-$C_9-C_{11}$alkyl trimellitates. The last-mentioned trimellitates are formed by esterifying trimellitic acid by means of the appropriate alkanol mixtures. Preferred trimellitates are tri-2-ethylhexyl trimellitate and said trimellitates made from alkanol mixtures. Customary abbreviations are TOTM (trioctyl trimellitate, tri-2-ethylhexyl trimellitate), TIDTM (triisodecyl trimellitate) and TITDTM (triisotridecyl trimellitate).

D) Epoxy plasticizers such as 1,2-epoxides and oxiranes; examples thereof are epoxidized polybutadiene, epoxidized soybean oil, epoxidized linseed oil, epoxidized fish oil, epoxidized tallow, methylbutyl or 2-ethylhexyl epoxystearate, tris(epoxypropyl) isocyanurate, epoxidized castor oil, epoxidized sunflower oil, 3-(2-phenoxy)-1,2-epoxypropane, bisphenol A polyglycidyl ether, vinylcyclohexene diepoxide, dicyclopentadiene diepoxide and 3,4-epoxycyclohexylmethyl-3,4-epoxycyclohexanecarboxylate.

E) Polymer plasticizers

A definition of these plasticizers and examples thereof are given in "Plastics Additives", edited by R. Gaichter and H. Müller, Hanser Verlag, 3rd edition, 1990, page 393, chapter 5.9.6, and in "PVC Technology", edited by W. V. Titow, 4th Ed., Elsevier Publ., 1984, pages 165–170. The most usual starting materials for the preparation of polyester plasticizers are: dicarboxylic acids, such as adipic, phthalic, azelaic and sebacic acids; diols, such as 1,2-propanediol, 1,3-butanediol, 1,4-butanediol, 1,6-hexanediol, neopentyl glycol and diethylene glycol; monocarboxylic acids, such as acetic, caproic, caprylic, lauric, myristic, palmitic, stearic, pelargonic and benzoic acids; monofunctional alcohols, such as isooctanol, 2-ethylhexanol, isodecanol and $C_7$–$C_9$ alkanol and $C_9$–$C_{11}$ alkanol mixtures. Particularly advantageous are polyester plasticizers made from said dicarboxylic acids and monofunctional alcohols.

F) Esters of phosphoric acid

A definition of these esters is given in the abovementioned handbook "Plastics Additives" on page 390, chapter 5.9.5. Examples of these phosphates are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tri-2-ethylhexyl phosphate and ®Reofos 50 and 95.

G) Chlorinated hydrocarbons (paraffins)

H) Hydrocarbons

I) Monoesters, for example butyl oleate, phenoxyethyl oleate, tetrahydrofurfuryl oleate, glycerol monooleate and esters of alkylsulfonic acids.

J) Glycol esters, for example diglycol benzoates.

Definitions and examples of plasticizers from groups G) to J) are given in the following handbooks:

"Plastics Additives", edited by R. Gächter and H. Müller, Hanser Verlag, 1990, page 284, chapter 5.9.14.2 (Group G)) and chapter 5.9.14.1 (Group H)).

"PVC Technology", edited by W. V. Titow, 4th Ed., Elsevier Publishers, 1984, pages 171–173, chapter 6.10.2 (Group G)), page 174, chapter 6.10.5 (group H)), page 173, chapter 6.10.3 (group I)) and pages 173–174, chapter 6.10.4 (group J)).

Particular preference is given to plasticizers from groups A) to G), in particular A) to F), especially the plasticizers in these groups which have been mentioned as preferred.

In general, from 5 to 120 parts, in particular from 10 to 100 parts, of the plasticizers from groups A), B), C) and E), from 0.5 to 30 parts, in particular from 0.5 to 20 parts, of those from group D) and from 1 to 100 parts, in particular from 2 to 80 parts, of those from groups F) and G) are present. It is also possible to use mixtures of different plasticizers.

The plasticizers can be used in a total amount of, for example, from 5 to 120 parts by weight, preferably from 10 to 100 parts by weight, in particular from 20 to 70 parts by weight, based on 100 parts by weight of PVC.

The novel halogen-containing polymer can contain further additives. These further additives belong, in particular, to the group consisting of thermal and/or light stabilizers. Thermal stabilization here covers both processing and use (long-term stability). These further additives are known to the person skilled in the art and are predominantly commercially available. They are, for example, inorganic or organic zinc, barium, lead, cadmium, aluminium, calcium, magnesium or rare-earth compounds, zeolites, hydrotalcites, dawsonite, magadiite, kenyaite, kanemite, tin stabilizers, 1,3-diketo compounds, polyols, N-containing compounds, for example β-aminocrotonates, as mentioned in EP 0 465 405, p. 6, lines 9–14, α-phenylindole, pyrroles, sterically hindered amines (HALS), dihydropyridines and polymers thereof, epoxides, phenolic antioxidants (HANDBOOK OF PVC FORMULATING, E. J. Wickson, John Wiley & Sons, Inc., 1993, pp. 505–515), naphthols, thiophosphates, fillers (HANDBOOK OF PVC FORMULATING E. J. Wickson, John Wiley & Sons, Inc., 1993 pp. 393–449) and reinforcing materials (TASCHENBUCH der KUNSTSTOFF-ADDITIVE, R. Gächter & H. Müller, Carl Hanser, 1990, pp. 549–615) (for example calcium carbonate, magnesium oxide, magnesium hydroxide, silicates, glass fibres, talc, kaolin, chalk, mica, metal oxides and hydroxides, carbon black or graphite), phosphites, chelating agents (TASCHENBUCH der KUNSTSTOFF-ADDITIVE, R. Gächter & H. Müller, Carl Hanser, 1990, pp. 109-131), light stabilizers, UV absorbers (HANDBOOK OF PVC FORMULATING E. J. Wickson, John Wiley & Sons, Inc., 1993 pp. 355–369), lubricants (HANDBOOK OF PVC FORMULATING E. J. Wickson, John Wiley & Sons, Inc., 1993 pp.369–393), impact modifiers (IMPACT MODIFIERS FOR PVC, J. T. Lutz & D. L. Dunkelberger, John Wiley & Sons, Inc., 1992) and processing auxiliaries (TASCHENBUCH der KUNSTSTOFF-ADDITIVE, R. Gächter & H. Müller, Carl Hanser, 1990, pp. 505–524), fatty acid esters, paraffins, blowing agents (HANDBOOK OF PVC FORMULATING E. J. Wickson, John Wiley & Sons, Inc., 1993 pp. 525–551)), optical brighteners (TASCHENBUCH der KUNSTSTOFF-ADDITIVE, R. Gächter & H. Müller, Carl Hanser, 1990, pp. 807–821), gelling aids, dyes (HANDBOOK OF PVC FORMULATING E. J. Wickson, John Wiley & Sons, Inc., 1993 pp. 449–475), pigments (TASCHENBUCH der KUNSTSTOFF-ADDITIVE, R. Gächter & H. Müller, Carl Hanser, 1990, pp. 663–735), flameproofing agents and smoke retardants (HANDBOOK OF PVC FORMULATING E. J. Wickson, John Wiley & Sons, Inc., 1993 pp. 551–579), antifogging agents (HANDBOOK OF PVC FORMULATING E. J. Wickson, John Wiley & Sons, Inc., 1993 pp. 475–487), biocides, thiodipropionic acid and esters thereof, dialkyl disulfides (HANDBOOK OF PVC FORMULATING E. J. Wickson, John Wiley & Sons, Inc., 1993 pp. 515–525), mercaptocarboxylic esters, peroxide scavengers, modifiers and further complexing agents for Lewis acids.

Preference is given to an antistatic halogen-containing polymer, as described above, which additionally comprises at least one inorganic zinc, barium, cadmium, aluminium, calcium, magnesium or rare-earth compound, for example zinc oxide, hydroxide, chlorite or sulfide or superbasic zinc oxide/hydroxide addition compounds, or an organic zinc, barium, cadmium, aluminium, calcium, magnesium or rare-earth compound from the series consisting of aliphatic, saturated $C_2$–$C_{22}$ carboxylates, aliphatic, unsaturated $C_3$–$C_{22}$ carboxylates, aliphatic $C_2$–$C_{22}$ carboxylates which are substituted by at least one OH group or whose chain is interrupted by at least one O atom (oxa acids), cyclic and bicyclic carboxylates having 5–22 carbon atoms, phenylcarboxylates which are unsubstituted, substituted by at least one OH group and/or substituted by $C_1$–$C_{16}$ alkyl, naphthylcarboxylates which are unsubstituted, substituted by at least one OH group and/or substituted by at least one OH group and/or substituted by $C_1$–$C_{16}$alkyl, phenyl-$C_1$–$C_{16}$alkylcarboxylates, naphthyl-$C_1$–$C_{16}$alkylcarboxylates or unsubstituted or $C_1$–$C_{12}$alkyl-substituted phenoxides.

Said metal compounds can be in the form of mixtures of different compounds. Preference is given to so-called synergistic metal-soap mixtures, for example of the metals Ca and Zn or Ba and Zn. It is also possible for organic zinc, barium, cadmium, aluminium, calcium, magnesium or rare-earth compounds to be coated onto a hydrotalcite, zeolite or dawsonite; in this respect see also DE-A-4 031 818.

Specific mention may be made by way of example of zinc, barium, cadmium, aluminium, calcium, magnesium or rare-earth salts of monovalent carboxylic acids, such as acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, isostearic acid, stearic acid, 12-hydroxystearic acid, 9,10-dihydroxystearic acid, 3,6-dioxaheptanoic acid, 3,6,9-trioxadecanoic acid, behenic acid, benzoic acid, p-tert-butylbenzoic acid, dimethylhydroxybenzoic acid, 3,5-di-tert-butyl-4-hydroxybenzoic acid, tolic acid, dimethylbenzoic acid, ethylbenzoic acid, n-propylbenzoic acid, salicylic acid, p-tert-octylsalicylic acid and sorbic acid; zinc salts of monoesters of divalent carboxylic acids, such as of oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, 3,6,9-trioxadecane-1,10-dicarboxylic acid, polyglycoldicarboxylic acid (n=10–12), phthalic acid, isophthalic acid, terephthalic acid and hydroxyphthalic acid; and diesters and triesters of trivalent and tetravalent carboxylic acids, such as of hemimellitic acid, trimellitic acid, pyromellitic acid and citric acid, and metal salts of mono- and diesterified phosphoric acid or of monoesterified phosphorous acid, as described in JP 3 275 570.

Preference is given to organic metal compounds, in particular an organic metal carboxylate of a carboxylic acid having 7 to 18 carbon atoms (metal soaps), for example benzoates or alkanoates, preferably stearates, oleates, laurates, palmitates, behenates, hydroxystearates, dihydroxystearates and (iso)octanoates. Particular preference is given to stearates, oleates, benzoates, p-tert-butylbenzoates and 2-ethylhexanoates.

Further information on the suitable and preferred aluminium compounds are given in U.S. Pat. No. 4,060,512. Of the inorganic and organic calcium and magnesium compounds, preference is furthermore given to organic calcium and magnesium compounds, in particular calcium and magnesium soaps, and calcium oxide, calcium hydroxide and superbasic calcium compounds, as described, for example, in EP 0 446 685, 0 394 547 and 0 279 493. The term rare-earth compound is in particular taken to mean compounds of the elements cerium, praseodymium, neodymium, samarium, europium, gadolinium, terbium, dysprosium, holmium, erbium, thulium, ytterbium, lutetium, lanthanum and yttrium, preference being given to mixtures, in particular with cerium. Further preferred rare-earth compounds are given in EP-A-0 108 023.

The inorganic or preferably organic zinc, barium, cadmium, aluminium, calcium, magnesium or rare-earth compound can be employed in an amount of, for example, 0.001 to 10 parts by weight, preferably from 0.01 to 5 parts by weight, particularly preferably from 0.1 to 3 parts by weight, based on 100 parts by weight of halogen-containing polymer.

Use can also be made in this invention of inorganic or organic lead compounds, for which the above information on zinc, barium, cadmium, aluminium, calcium, magnesium or rare-earth compounds applies analogously. Emphasis should be made of tribasic lead sulfate, dibasic lead phosphite, dibasic lead phthalate, dibasic lead carbonate and neutral or dibasic lead stearate. The lead compound can be employed in an amount of, for example, from 0.001 to 10 parts by weight, preferably from 0.01 to 5 parts by weight, particularly preferably from 0.1 to 3 parts by weight, based on 100 parts by weight of halogen-containing polymer.

Use can also be made in this invention of tin compounds (tin stabilizers), for example organotin compounds of formulae (Sn-I) to (Sn-IV)

$$[R_1]_i Sn[-Q-R_2]_{4-i} \quad (Sn\text{-}I)$$

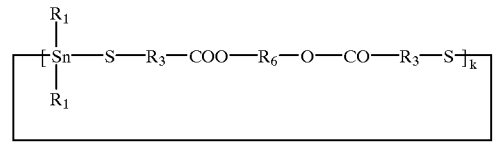 (Sn-II)

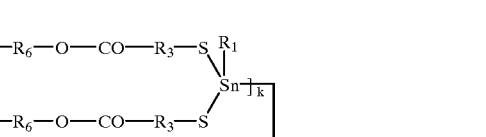 (Sn-III)

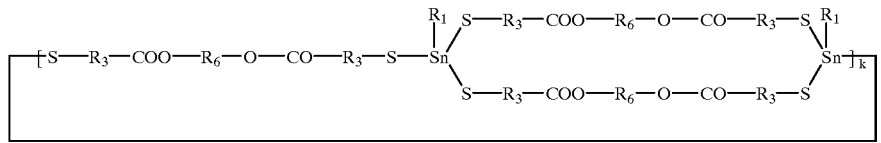 (Sn-IV)

in which
$R_1$ is $C_1$–$C_{12}$alkyl or $C_1$–$C_8$alkoxycarbonylethyl,
Q is —S— or —O—CO—, and,
when Q is —S—,
$R_2$ is $C_8$–$C_{18}$alkyl, —$R_3$—COO—$R_4$ or —(CH$_2$)$_2$—O—CO—$R_4$, or
when Q is —O—CO—,
$R_2$ is $C_1$–$C_{18}$alkyl, $C_2$–$C_{18}$alkenyl, or unsubstituted or $C_1$–$C_4$alkyl-substituted phenyl;
$R_3$ is methylene, ethylene or o-phenylene,
$R_4$ is $C_5$–$C_{18}$alkyl,
$R_5$ is methylene, ethylene or o-phenylene,
$R_6$ is $C_2$–$C_4$alkylene or $C_4$–$C_8$alkylene which is interrupted by oxygen,
i is the number 1 or 2, j is a number in the range from 1 to 6, and k is a number in the range from 1 to 3.

Preference is given to organotin compounds of the formulae (Sn-I) to (Sn-IV) in which $R_1$ is $C_1$–$C_{12}$alkyl, when Q is —S—, $R_2$ is $C_8$–$C_{18}$alkyl or —$R_3$—COO—$R_4$, or when Q is —O—CO—, $R_2$ is $C_7$–$C_{18}$alkyl, $C_8$–$C_{18}$alkenyl or phenyl;

$R_3$ is methylene or ethylene, $R_4$ is $C_5$–$C_{18}$alkyl, $R_5$ is ethylene or o-phenylene, $R_6$ is $C_2$–$C_4$alkylene or $C_4$–$C_8$alkylene which is interrupted by oxygen, i is the number 1 or 2, j is a number in the range from 1 to 4, and k is the number 1 or 2.

Particularly preferred organotin compounds are $(CH_3CH_2CH_2CH_2)_2Sn(SCH_2CO_2CH_2CH(CH_2CH_3)CH_2CH_2CH_2CH_3)_2$ [dibutyltin bis-(2-ethylhexylthioglycolate)], $CH_3CH_2CH_2CH_2Sn(SCH_2CO_2CH_2CH(CH_2CH_3)CH_2CH_2CH_2CH_3)_3$ [monobutyltin tris-(2-ethylhexylthioglycolate)] and $(CH_3CH_2CH_2CH_2)_2Sn(O—CO—C_7H_{15})_2$ [dibutyltin bis (isooctanoate)].

The preferred organotin compound can be employed in an amount of, for example, from 0.001 to 10 parts by weight, preferably from 0.01 to 5 parts by weight, particularly preferably from 0.1 to 3 parts by weight, based on 100 parts by weight of halogen-containing polymer.

Use can also be made in this invention of epoxy compounds, such as 1,2-epoxides and oxiranes, which are used in amounts of, for example, up to 10 parts by weight, preferably up to 5 parts by weight, particularly preferably from 0.01 to 2 parts by weight, based on 100 parts by weight of halogen-containing polymer. Examples of these compounds are epoxidized polybutadiene, epoxidized soybean oil, epoxidized linseed oil, epoxidized fish oil, epoxidized tallow, methylbutyl and 2-ethylhexyl epoxystearate, tris (epoxypropyl) isocyanurate, epoxidized castor oil, epoxidized sunflower oil, 3-(2-phenoxy)-1,2-epoxypropane, bisphenol A polyglycidyl ether, vinylcyclohexene diepoxide, dicyclopentadiene diepoxide and 3,4-epoxycyclohexylmethyl 3,4-epoxycyclohexanecarboxylate.

Other epoxide compounds which can be used in the invention can have an aliphatic, aromatic, cycloaliphatic, araliphatic or heterocyclic structure; they contain epoxide groups as side groups. The epoxide groups are preferably bonded to the remainder of the molecule as glycidyl groups via ether or ester bonds, or are N-glycidyl derivatives of heterocyclic amines, amides or imides. Epoxide compounds of these types are known in general terms and are commercially available.

The epoxide compounds contain at least one epoxide radical, in particular those of the formula II

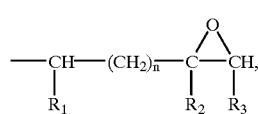

(II)

where $R_1$ and $R_3$ are both hydrogen, $R_2$ is hydrogen or methyl, and n is 0, or in which $R_1$ and $R_3$ together are —$CH_2$—$CH_2$— or —$CH_2$—$CH_2$—$CH_2$—, $R_2$ is then hydrogen, and n is 0 or 1 and this epoxide radical is bonded directly to carbon, oxygen, nitrogen or sulfur atoms.

Examples which may be mentioned of epoxide compounds are:

I) Glycidyl and β-methylglycidyl esters obtainable by reacting a compound containing at least one carboxyl group in the molecule and epichlorohydrin or glycerol dichlorohydrin or β-methylepichlorohydrin. The reaction is preferably carried out in the presence of bases.

The compounds containing at least one carboxyl group in the molecule can be aliphatic carboxylic acids. Examples of these carboxylic acids are glutaric acid, adipic acid, pimelic acid, suberic acid, azelaic acid, sebacic acid or dimerized or trimerized linoleic acid, acrylic acid, methacrylic acid, caproic acid, caprylic acid, lauric acid, myristic acid, palmitic acid, stearic acid and pelargonic acid, and the acids mentioned in the case of the organic zinc compounds.

However, it is also possible to employ cycloaliphatic carboxylic acids, for example cyclohexanecarboxylic acid, tetrahydrophthalic acid, 4-methyltetrahydrophthalic acid, hexahydrophthalic acid or 4-methylhexahydrophthalic acid.

It is also possible to use aromatic carboxylic acids, for example benzoic acid, phthalic acid, isophthalic acid, trimellitic acid or pyromellitic acid.

It is likewise possible to use carboxyl-terminated adducts, for example of trimellitic acid and polyols, for example glycerol or 2,2-bis(4-hydroxycyclohexyl)propane.

Other epoxide compounds which can be used for the purposes of the present invention are given in EP 0 506 617.

II) Glycidyl or β-methylglycidyl ethers obtainable by reacting a compound containing at least one free alcoholic hydroxyl group and/or phenolic hydroxyl group and a suitably substituted epichlorohydrin under alkaline conditions, or in the presence of an acid catalyst followed by alkali treatment.

Ethers of this type are derived, for example, from acyclic alcohols, such as ethylene glycol, diethylene glycol and higher poly(oxyethylene) glycols, propane-1,2-diol or poly (oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins, butanol, amyl alcohol, pentanol and from monofunctional alcohols such as isooctanol, 2-ethylhexanol, isodecanol and $C_7$–$C_9$alkanol and $C_9$–$C_{11}$alkanol mixtures.

However, they are also derived, for example, from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis (hydroxymethyl)cyclohex-3-ene, or they contain aromatic rings, such as N,N-bis(2-hydroxyethyl)aniline or p,p'-bis(2-hydroxyethylamino)diphenylmethane.

The epoxide compounds can also be derived from monocyclic phenols, for example from phenol, resorcinol or hydroquinone; or they are based on polycyclic phenols, for example on bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulfone or on condensation products of phenols with formaldehyde obtained under acid conditions, such as phenol novolaks.

Examples of other possible terminal epoxides are: glycidyl 1-naphthyl ether, glycidyl 2-phenylphenyl ether, 2-biphenyl glycidyl ether, N-(2,3-epoxypropyl)phthalimide and 2,3-epoxypropyl 4-methoxyphenyl ether.

III) N-Glycidyl compounds obtainable by dehydrochlorinating the products of the reaction of epichlorohydrin with amines, which contain at least one amino hydrogen atom. These amines are, for example, aniline, N-methylaniline, toluidine, n-butylamine, bis(4-aminophenyl)methane, m-xylylenediamine or bis(4-methylaminophenyl)methane, but also N,N,O-triglycidyl-m-aminophenol or N,N,O-triglycidyl-p-aminophenol.

However, the N-glycidyl compounds also include N,N'-di-, N,N',N''-tri- and N,N',N'',N'''-tetraglycidyl derivatives of cycloalkyleneureas, such as ethyleneurea or 1,3-propyleneurea, and N,N-diglycidyl derivatives of hydantoins, such as of 5,5-dimethylhydantoin or glycol uril and triglycidyl isocyanurate.

IV) S-Glycidyl compounds, for example di-S-glycidyl derivatives derived from dithiols, for example ethane-1,2-dithiol or bis(4-mercaptomethylphenyl) ether.

V) Epoxide compounds containing a radical of the formula II in which $R_1$ and $R_3$ together are —$CH_2$—$CH_2$—, and n is 0, are bis(2,3-epoxycyclopentyl) ether, 2,3-epoxycyclopentyl glycidyl ether or 1,2-bis(2,3-epoxycyclopentoxy)ethane. An example of an epoxide compound containing a radical of the formula II in which $R_1$ and $R_3$ together are —$CH_2$—$CH_2$— and n is 1 is 3'4'-epoxy-6'-methylcyclohexyl)methyl 3,4-epoxy-6-methylcyclohexanecarboxylate.

Examples of suitable terminal epoxides are:
a) liquid bisphenol A diglycidyl ethers, such as Araldit®GY 240, Araldit®GY 250, Araldit®GY 260, Araldit®GY 266, Araldit®GY 2600, Araldit®MY 790;
b) solid bisphenol A diglycidyl ethers, such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610;
c) liquid bisphenol F diglycidyl ethers, such as Araldit®GY 281, Araldit®PY 302, Araldit@PY 306;
d) solid polyglycidyl ethers of tetraphenylethane, such as CG Epoxy Resin®0163;
e) solid and liquid polyglycidyl ethers of phenol-formaldehyde novolak, such as EPN 1138, EPN 1139, GY 1180, PY 307;
f) solid and liquid polyglycidyl ethers of o-cresol-formaldehyde novolak, such as ECN 1235, ECN 1273, ECN 1280, ECN 1299;
g) liquid glycidyl ethers of alcohols, such as Shell® glycidyl ether 162, Araldit®DY 0390, Araldit®DY 0391;
h) liquid glycidyl ethers of carboxylic acids, such as Shell®Cardura E terephthalates, trimellitates, Araldit®PY 284;
i) solid heterocyclic epoxy resins (triglycidyl isocyanurates), such as Araldit® PT 810;
j) liquid cycloaliphatic epoxy resins, such as Araldit®CY 179;
k) liquid N,N,O-triglycidyl ether of p-aminophenol, such as Araldit®MY 0510;
l) tetraglycidyl-4,4'-methylenebenzamine or N,N,N',N'-tetraglycidyldiaminophenylmethane, such as Araldit®MY 720, Araldit®MY 721.

Preference is given to epoxide compounds containing two functional groups. However, it is in principle possible for epoxide compounds containing one, three or more functional groups to be used.

Predominant use is made of diglycidyl compounds containing aromatic structures, for example phenyl groups.

If desired, a mixture of epoxide compounds having different structures can also be employed.

Particularly preferred polyfunctional epoxide compounds are diglycidyl ethers based on bisphenols, for example on 2,2-bis(4-hydroxyphenyl)propane (bisphenol A), bis(4-hydroxyphenyl)methane or mixtures of bis(ortho/para-hydroxyphenyl)methane (bisphenol F).

1,3-Diketo compounds which can be used can be linear or cyclic dicarbonyl compounds. Preference is given to diketo compounds of the formula (III)

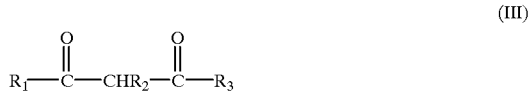

(III)

in which $R_1$ is $C_1$–$C_{22}$alkyl, $C_5$–$C_{10}$hydroxyalkyl, $C_2$–$C_{18}$alkenyl, phenyl, phenyl which is substituted by OH, $C_1$–$C_4$alkyl, $C_1$–$C_4$alkoxy or halogen, $C_7$–$C_{10}$phenylalkyl, $C_5$–$C_{12}$cycloalkyl, $C_5$–$C_{12}$cycloalkyl which is substituted by $C_1$–$C_4$alkyl, or an —$R_5$—S—$R_6$ or —$R_5$—O—$R_6$ group, $R_2$ is hydrogen, $C_1$–$C_8$alkyl, $C_2$–$C_{22}$alkenyl, phenyl, $C_7$–$C_{12}$alkylphenyl, $C_7$–$C_{10}$phenylalkyl or a —CO—$R_4$ group, $R_3$ has one of the meanings given for $R_1$ or is $C_1$–$C_{18}$alkoxy, $R_4$ is $C_1$–$C_4$alkyl or phenyl, $R_5$ is $C_1$–$C_{10}$alkylene, and $R_6$ is $C_1$–$C_{12}$alkyl, phenyl, $C_7$–$C_{18}$alkylphenyl or $C_7$–$C_{10}$phenylalkyl.

These include the hydroxyl-containing diketones of EP-A-346 279 and the oxa- and thiadiketones of EP-A-307 358.

Alkyl $R_1$ and $R_3$ can be, in particular, $C_1$–$C_{18}$alkyl, for example methyl, ethyl, n-propyl, isopropyl, n-butyl, tert-butyl, pentyl, hexyl, heptyl, octyl, decyl, dodecyl or octadecyl.

Hydroxyalkyl $R_1$ and $R_3$ are, in particular, a —($CH_2$)$_n$—OH group, in which n is 5, 6 or 7.

Alkenyl $R_1$ and $R_3$ can be, for example, vinyl, allyl, methallyl, 1-butenyl, 1-hexenyl or oleyl, preferably allyl.

OH—, alkyl-, alkoxy- or halogen-substituted phenyl $R_1$ and $R_3$ can be, for example, tolyl, xylyl, tert-butylphenyl, methoxyphenyl, ethoxyphenyl, hydroxyphenyl, chlorophenyl or dichlorophenyl.

Phenylalkyl $R_1$ and $R_3$ are, in particular, benzyl. Cycloalkyl or alkylcycloalkyl $R_2$ and $R_3$ are, in particular, cyclohexyl or methylcyclohexyl.

Alkyl $R_2$ can be, in particular, $C_1$–$C_4$alkyl. $C_2$–$C_{12}$alkenyl $R_2$ can be, in particular, allyl. Alkylphenyl $R_2$ can be, in particular, tolyl. Phenylalkyl $R_2$ can be, in particular, benzyl. $R_2$ is preferably hydrogen. Alkoxy $R_3$ can be, for example, methoxy, ethoxy, butoxy, hexyloxy, octyloxy, dodecyloxy, tridecyloxy, tetradecyloxy, or octadecyloxy. $C_1$–$C_{10}$alkylene $R_5$ is, in particular, $C_2$–$C_4$alkylene. Alkyl $R_6$ is, in particular, $C_4$–$C_{12}$alkyl, for example butyl, hexyl, octyl, decyl or dodecyl. Alkylphenyl $R_6$ is, in particular, tolyl. Phenylalkyl $R_6$ is, in particular, benzyl.

Examples of 1,3-dicarbonyl compounds of the formula (III) are acetylacetone, acetylcyclopentanone, benzoylcyclopentanone, acetylbutyrolactone, benzoylbutyrolactone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoylbenzoylmethane, stearoylbenzoylmethane, 5-hydroxycaproylbenzoylmethane, tribenzoylmethane, bis(4-methylbenzoyl)methane, benzoyl-p- chlorobenzoylmethane, bis(2-hydroxybenzoyl)methane, 4-methoxybenzoylbenzoylmethane, bis(4-methoxybenzoyl)methane, 1-benzoyl-1-acetylnonane, benzoylacetylphenylmethane, stearoyl-4-methoxybenzoylmethane, bis(4-tert-butylbenzoyl)methane, benzoylformylmethane, benzoylphenylacetylmethane, bis(cyclohexanoyl)methane, di(pivaloyl)methane, methyl, ethyl, hexyl, octyl, dodecyl or octadecyl acetoacetate, ethyl, butyl, 2-ethylhexyl, dodecyl or octadecyl benzoylacetate, ethyl, propyl, butyl, hexyl or octyl stearoyl acetate and dehydracetic acid, and the barium, magnesium, calcium, zinc or aluminium salts thereof.

Preference is given to 1,3-diketo compounds of the formula (III) in which $R_1$ is $C_1$–$C_{18}$alkyl, phenyl, phenyl which is substituted by OH, methyl or methoxy, $C_7$–$C_{10}$phenylalkyl or cyclohexyl, $R_2$ is hydrogen, and $R_3$ has one of the meanings given for $R_1$.

Particular preference is given to magnesium, calcium, zinc and aluminium acetylacetonates, stearoylbenzoylmethane, dibenzoylmethane, benzoyloctanoylmethane and the triacetoacetic esters of trisethyl isocyanurate, as described in U.S. Pat. No. 4,339,383. A review of 1,3-diketo compounds is given in EP 006 318, EP 0 046 161, EP 0 035 268 and EP 0 040 286.

The 1,3-diketo compounds can be used in an amount of, for example, from 0.01 to 10 parts by weight, preferably from 0.01 to 2 parts by weight, in particular from 0.05 to 1 part by weight, based on 100 parts by weight of halogen-containing polymer.

Further possible additional additives are 1,3-keto esters of the formula (IV)

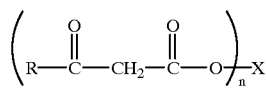
(IV)

in which n is 1, 2, 3, 4 or 6 and,
when n=1, R is phenyl, and X is a $C_{10}$–$C_{20}$alkyl group,
when n=2, R is $C_1$–$C_4$alkyl or phenyl, and X is $C_4$–$C_{12}$alkylene, $C_2$–$C_{12}$alkylene which is substituted by at least one $C_1$–$C_8$alkyl group, or is —CH$_2$—CH$_2$—S—CH$_2$—CH$_2$—S—CH$_2$—CH$_2$— or —CH$_2$—CH$_2$—S—CH$_2$—CH$_2$—,
when n=3, R is $C_1$–$C_4$alkyl or phenyl, and X is CH$_3$CH$_2$C(CH$_2$—)$_3$,
when n=4 ist, R is $C_1$–$C_4$alkyl or phenyl and X is the

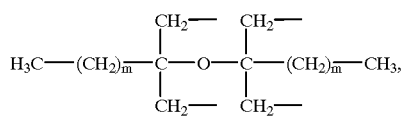

group, in which m is 0 or 1, and,
when n=6, R is $C_1$–$C_4$alkyl or phenyl and X is the

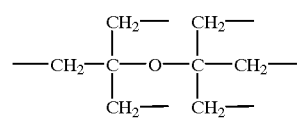

group.

$C_1$–$C_4$Alkyl R is, for example, methyl, ethyl, propyl or butyl.

$C_{10}$–$C_{20}$Alkyl X can be straight-chain or branched and is, for example, n-decyl, n-dodecyl or n-octadecyl.

$C_4$–$C_{12}$Alkylene X or $C_2$–$C_{12}$alkylene X which is substituted by at least one $C_1$–$C_8$alkyl group is, for example, 1,2-di-tert-butyldimethylene, tetramethylene, hexamethylene, 2,2-dimethyltrimethylene, 2-ethyl-2-butyltrimethylene, 2-methyl-2-propyltrimethylene, octamethylene, nonamethylene, decamethylene or dodecamethylene.

The variable n is preferably 1, 2 or 3, as described in EP 0 433 230.

Further possible additional additives are compounds of the formula (V)

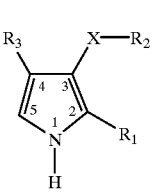
(V)

in which X is a

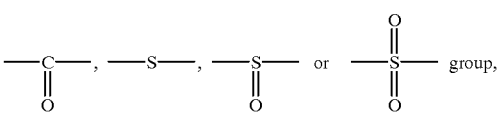 group, $R_1$ and $R_2$, independently of one another, are $C_1$–$C_{20}$alkyl, hydroxyl- and/or halogen-substituted $C_1$–$C_{10}$alkyl, $C_3$–$C_{20}$alkenyl, $C_5$–$C_{12}$cycloalkyl, $C_1$–$C_4$alkyl-substituted $C_5$–$C_8$cycloalkyl, phenyl or phenyl which is substituted by 1 to 3 radicals $A_1$, where the radicals $A_1$, independently of one another, are $C_1$–$C_{10}$alkyl, halogen, hydroxyl, methoxy or ethoxy, $R_1$ and $R_2$ are furthermore $C_7$–$C_{10}$phenylalkyl or $C_7$–$C_{10}$phenylalkyl which is substituted on the phenyl by 1 to 3 radicals $A_2$, where the radicals $A_2$, independently of one another, are $C_1$–$C_{20}$phenylalkyl, halogen, hydroxyl, methoxy or ethoxy, and $R_3$ is phenyl or phenyl which is substituted by 1 to 3 radicals $A_3$, where the radicals $A_3$, independently of one another, are $C_1$–$C_{10}$alkyl, halogen, hydroxyl, methoxy, ethoxy or ($C_1$–$C_8$alkyl)oxycarbonyl, with the provisos that at least one of the radicals $R_1$ and $R_2$ is phenyl or phenyl which is substituted as defined, and $R_1$ is not methyl if $R_2$ is phenyl.

The compounds of the above formula are distinguished by very good stabilizing action both to thermal and photoinduced degradation. The long-term stabilizing action against thermal degradation is particularly noteworthy.

$R_1$ is preferably not $C_1$–$C_3$alkyl, in particular $C_1$–$C_{20}$alkyl, when $R_2$ is phenyl.

Halogen is preferably chlorine.

$C_1$–$C_{20}$Alkyl is, for example, methyl, ethyl, propyl, butyl, t-butyl, pentyl, hexyl, heptyl, octyl, i-octyl, i-nonyl, decyl, dodecyl or octadecyl.

Hydroxyl- and/or halogen-substituted $C_1$–$C_{10}$alkyl is, for example, 5-hydroxypentyl, 2,3,5-trihydroxypentyl or 5-chloropentyl.

$C_3$–$C_{20}$Alkenyl is, for example, allyl, 2-methallyl, 3-methylbut-2-enyl, 3-methylbut-3-enyl, hexenyl, decenyl, undecenyl, heptadecenyl or oleyl. Preferred meanings are allyl, methallyl and oleyl.

$C_5$–$C_{12}$Cycloalkyl is, for example, cyclopentyl, cyclohexyl, cycloheptyl, cyclooctyl, cyclodecyl or cyclododecyl. $C_5$–$C_7$Cycloalkyl, in particular cyclohexyl, is preferred.

C5–C8Cycloalkyl which is substituted by $C_1$–$C_4$alkyl, in particular methyl, is, for example, methylcyclohexyl or tert-butylcyclohexyl.

Examples of phenyl which is substituted by 1 to 3 radicals as defined are o-, m- or p-methylphenyl, 2,3-dimethylphenyl, 2,4-dimethy cphenyl, 2,5-dimethylphenyl, 2,6-dimethylphenyl, 3,4-dimethylphenyl, 3,5-dimethylphenyl, 2-methyl-6-ethylphenyl, 2-methyl-4-tert-butylphenyl, 2-ethylphenyl, 2,6-diethylphenyl, 2,6-diethyl-4-methylphenyl, 2,6-diisopropylphenyl, 4-tert-butylphenyl, p-nonylphenyl, o-, m- or p-chlorophenyl, 2,3-dichlorophenyl, 2,4-dichlorophenyl, 2,5-dichlorophenyl, 2,6-dichlorophenyl, 3,4-dichlorophenyl, 2,4,5-trichlorophenyl, 2,4,6-trichlorophenyl, o-, m- or p-hydroxyphenyl, o-, m- or p-methoxyphenyl, o- or p-ethoxyphenyl, 2,4-dimethoxyphenyl, 2,5-dimethoxyphenyl, 2,5-diethoxyphenyl, o-, m- or p-methoxycarbonyl, 2-chloro-6-methylphenyl, 3-chloro-2-methylphenyl, 3-chloro-4-methylphenyl, 4-chloro-2-methylphenyl, 5-chloro-2-methylphenyl, 2,6-dichloro-3-methylphenyl, 2-hydroxy-4-methylphenyl, 3-hydroxy-4-methylphenyl, 2-methoxy-5-methylphenyl, 4-methoxy-2-methylphenyl, 3-chloro-4-methoxyphenyl, 3-chloro-6-methoxyphenyl, 3-chloro-4,6-di-methoxyphenyl and 4-chloro -2,5-dimethoxyphenyl.

$C_7$–$C_{10}$Phenylalkyl is, for example, benzyl or 2-phenylethyl. Benzyl is preferred. If the phenyl group in these radicals is substituted by 1 to 3 groups as defined, it can adopt the abovementioned meanings. $C_7$–$C_{10}$Phenylalkyl which is substituted on the phenyl group by $C_1$–$C_{20}$alkyl, preferably $C_8$–$C_{14}$ alkyl, is one of the preferred meanings. A further example which should be mentioned is dodecylbenzyl. A more precise list is given in EP 0465 405.

Further possible additional additives are pyrroles of the formula (VI)

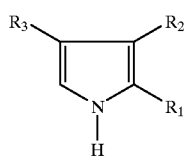

(VI)

in which $R_1$ is hydrogen, alkyl, cycloalkyl, aryl, alkoxycarbonylmethyl, unesterified or esterified hydroxyalkyl, unesterified or esterified hydroxycycloalkylmethyl, unesterified or esterified α-hydroxyalkyl, alkoxymethyl, alkylthiomethyl, aryloxymethyl, arylthiomethyl, cycloalkoxymethyl, cycloalkylthiomethyl, aralkoxymethyl, aralkylthiomethyl, alkoxy, alkylthio, cycloalkoxy, cycloalkylthio, aralkoxy, arylalkylthio, aryloxy, arylthio, halogen, mercapto, mercaptomethyl or hydroxyl, $R_2$ is hydrogen, alkyl, cycloalkyl, aryl, unesterified or esterified α-hydroxyalkyl, whose alkyl moiety may, together with $R_1$ be alkylene, unesterified or esterified α-hydroxycycloalkylmethyl, unesterified or esterified α-hydroxyaralkyl, alkoxy, cycloalkyloxy, aralkoxy, aryloxy, alkylthio, cycloalkylthio, aralkylthio, arylthio, alkoxymethyl, alkylthiomethyl, aryloxymethyl, arylthiomethyl, cycloalkoxymethyl, cycloalkylthiomethyl, aralkoxymethyl, arylalkylthiomethyl, hydroxyl, cyano, carboxyl, salted, esterified or amidated carboxyl or acyl, where acyl can, together with $R_1$, be —CO-alkylene, in which —CO— is bonded in the 3-position, or is halogen, mercapto or mercaptomethyl, and $R_3$ is alkyl, cycloalkyl, aralkyl, aryl, unesterified or esterified hydroxymethyl, alkoxymethyl, alkylthiomethyl, cycloalkoxymethyl, cycloalkylthiomethyl, aralkoxymethyl, arylalkylthiomethyl, aryloxymethyl or arylthiomethyl, alkoxy, alkylthio, cycloalkoxy, cycloalkylthio, aralkoxy, aralkylthio, aryloxy, arylthio, halogen, mercapto or mercaptomethyl, or, when $R_2$ is salted carboxyl, $R_3$ is hydrogen and $R_1$ is as defined above, in which $R_3$ is hydroxyl and $R_1$ is hydrogen, alkyl or aryl, and $R_2$ is hydrogen, alkyl, aryl or acyl, or a salt thereof. A list is given in EP 0 022 087.

Other possible additional additives are compounds of the formula (VII)

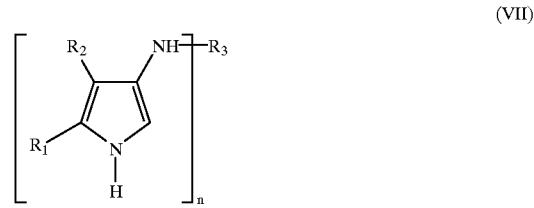

(VII)

in which n is 1 or 2, $R_1$ is $C_1$–$C_4$alkyl, $R_2$ is a group of the formula Ia, IIb, IIc or IId,

(IIa)

(IIb)

(IIc)

(IId)

$X_1$ is hydrogen, $C_1$–$C_{20}$alkyl, unsubstituted or OH-substituted $C_3$–$C_6$alkyl, which may be interrupted by one or two oxygen atoms or sulfur atoms, $C_3$–$C_{20}$alkenyl, $C_5$–$C_{12}$cycloalkyl, $C_1$–$C_4$alkyl-substituted $C_5$–$C_{12}$cycloalkyl, phenyl, $C_1$–$C_{10}$alkyl-, chlorine-, hydroxyl-, methoxy- and/or ethoxy-substituted phenyl, $C_7$–$C_{10}$phenylalkyl or $C_7$–$C_{10}$phenylalkyl which is substituted on the phenyl radical by $C_1$–$C_{20}$alkyl, chlorine, hydroxyl, methoxy and/or ethoxy, $X_2$ is phenyl or phenyl which is substituted by 1 to 3 radicals selected from the group consisting of $C_1$–$C_4$alkyl, chlorine, hydroxyl, methoxy, ethoxy and acetylamino, $X_3$ is $C_1$–$C_8$alkyl or phenyl, when n is 1, $R_3$ is a group of the formulae IIIa to IIIg,

(IIIa)

-continued

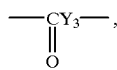  (IIIb)

  (IIIc)

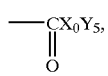  (IIId)

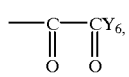  (IIIe)

  (IIIf)

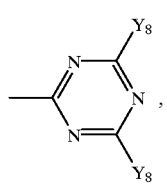  (IIIg)

XO is an oxygen atom or sulfur atom, $Y_1$ and Y2, independently of one another, are —CN, benzoyl, $C_2$–$C_4$alkanoyl or $C_2$–$C_4$alkoxycarbonyl, $Y_3$ is $C_1$–$C_{20}$alkyl, $C_3$–$C_{20}$alkenyl, phenyl, $C_1$–$C_4$alkyl-, chlorine-, $NO_2$—, methoxy- and/or ethoxy-substituted phenyl, 2-phenylethenyl, di($C_1$–$C_4$alkyl) amino, diphenylamino, $C_1$–$C_{20}$alkylamino, $C_3$–$C_8$cycloalkylamino, phenylamino, phenylamino which is substituted on the phenyl ring by $C_1$–$C_4$alkyl, chlorine, hydroxyl, methoxy and/or ethoxy, benzylamino, benzenesulfonamido or toluenesulfonamido, $Y_4$ is di($C_1$–$C_4$alkyl) amino, diphenylamino, $C_1$–$C_8$alkylamino, phenylamino, phenylamino which is substituted on the phenyl ring by $C_1$–$C_4$alkyl, chlorine, hydroxyl, methoxy and/or ethoxy, or benzylamino, $Y_5$ is $C_1$–$C_{20}$alkyl, $C_3$–$C_6$alkyl which is interrupted by one or two oxygen atoms, $C_5$–$C_{12}$cycloalkyl, $C_1$–$C_4$alkyl-substituted $C_5$–$C_{12}$cycloalkyl, phenyl, $C_7$–$C_{10}$phenylalkyl or $C_7$–$C_{10}$phenylalkyl which is substituted on the phenyl radical by $C_1$–$C_{20}$alkyl, $Y_6$ is $C_1$–$C_4$alkoxy, phenylamino or phenylamino which is substituted on the phenyl group by $C_1$–$C_4$alkyl, chlorine, hydroxyl, methoxy and/or ethoxy, $Y_7$ is $C_1$–$C_4$alkyl, phenyl or phenyl which is substituted by $C_1$–$C_4$alkyl, chlorine, —$NO_2$, ($C_1$–$C_{12}$alkyl)oxycarbonyl and/or phenoxycarbonyl, the radicals $Y_8$, independently of one another, are $C_1$–$C_4$alkoxy or allyloxy, and, when n is 2, $R_3$ is a group of the formula IVa, IVb, IVc or IVd

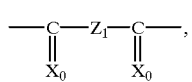  (IVa)

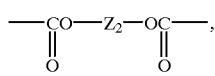  (IVb)

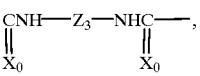  (IVd)

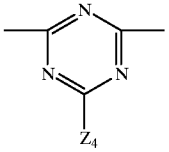  (IVd)

where $X_0$ is as defined above, $Z_1$ is a direct bond, $C_1$–$C_{12}$alkylene or phenylene, $Z_2$ is $C_2$–$C_{12}$alkylene or 3-oxapentylene, $Z_3$ is $C_4$–$C_8$alkylene or phenylene, and $Z_4$ is $C_1$–$C_4$alkoxy or allyloxy.

Alkyl having up to 20 carbon atoms is, for example, methyl, ethyl, propyl, butyl, t-butyl, pentyl, hexyl, heptyl, octyl, i-octyl, i-nonyl, decyl, dodecyl or octadecyl.

$R_1$ is preferably straight-chain $C_1$–$C_4$alkyl, preferably methyl.

A preferred meaning of $X_1$ is $C_1$–$C_{18}$alkyl, in particular $C_1$–$C_{12}$alkyl, for example methyl or ethyl.

Alkyl $X_3$ is preferably methyl or ethyl, in particular methyl.

Alkyl $Y_5$ preferably has 1 to 4 carbon atoms and is particularly preferably methyl or ethyl.

$C_1$–$C_4$Alkoxy is, for example, methoxy, ethoxy, propoxy or butoxy.

$C_3$–$C_6$Alkyl which is interrupted by 1 or 2 oxygen atoms is, for example, 3-oxabutyl, 3-oxapentyl, 3-oxaheptyl, 3,6-dioxaheptyl or 3,6-dioxaoctyl.

Unsubstituted or OH-substituted $C_3$–$C_6$alkyl which may be interrupted by 1 or 2 oxygen or sulfur atoms can be, for example, 3-thiabutyl, 3-thiapentyl, 3,6-dithiaheptyl, 3,6-dithiaoctyl, 5-hydroxy-3-oxapentyl, 5-hydroxy-3-thiapentyl or 4-hydroxybutyl in addition to the radicals indicated in the preceding paragraph.

$C_3$–$C_{20}$Alkenyl is, for example, allyl, 2-methallyl, 3-methylbut-2-enyl, 3-methylbut-3-enyl, hexenyl, decenyl, undecenyl, heptadecenyl or oleyl. Preferred meanings are allyl, methallyl and oleyl.

$C_5$–$C_{12}$Cycloalkyl, which is unsubstituted or substituted by $C_1$–$C_4$alkyl, in particular methyl, is, for example, cyclopentyl, cyclohexyl, cycloheptyl, cyclooctyl, cyclodecyl, cyclododecyl or methylcyclohexyl. Unsubstituted or substituted $C_5$–$C_8$cycloalkyl, in particular cyclohexyl, is preferred.

Examples of phenyl which is substituted by preferably 1 to 3, radicals as defined are o-, m- or p-chlorophenyl, 2,3-dichlorophenyl, 2,4-dichlorophenyl, 2,5-dichlorophenyl, 2,6-dichlorophenyl, 3,4-dichlorophenyl, 2,4,5-trichlorophenyl, 2,4,6-trichlorophenyl, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 2-methyl-4-tert-butylphenyl, 2-ethylphenyl, 2,6-diethylphenyl, 2,6-diethyl-4-methylphenyl, 2,6-diisopropylphenyl, 4-tert-butylphenyl, p-nonylphenyl, 2-chloro-6-methylphenyl, 3-chloro-2-methylphenyl, 3-chloro-4-methylphenyl, 4-chloro-2-methylphenyl, 5-chloro- 2-methylphenyl, 2,6-dichloro-3-methylphenyl, o-, m- or p-methoxyphenyl, o- or p-ethoxyphenyl, 2,4-dimethoxyphenyl, 2,5-dimethoxyphenyl, 2,5-diethoxyphenyl, 2-methoxy-5-methylphenyl, 4-methoxy-2-methylphenyl, 3-chloro-4-methoxyphenyl, 3-chloro-6- methoxyphenyl, 3-chloro-4,6-dimethoxyphenyl, 4-chloro-2,5-dimethoxyphenyl, o-, m- or p-hydroxyphenyl, 2-hydroxy-4-methylphenyl, 3-hydroxy-4-methylphenyl, o-, m- or p-acetylaminophenyl, o-, m- or p-nitrophenyl, p-($C_1$–$C_{12}$alky)oxycarbonylphenyl and p-phenyloxycarbonylphenyl.

If $Y_3$, $Y_4$ and $Y_6$ are phenylamino which is substituted on the phenyl radical by, preferably 1 to 3, radicals as defined, the substituted phenyl radical can have, for example, the abovementioned meanings.

$C_7$–$C_{10}$Phenylalkyl is, for example, benzyl or 2-phenylethyl. Benzyl is preferred. If the phenyl group in these radicals is substituted by, preferably 1 to 3, groups as defined, it can adopt the abovementioned meanings. $C_7$–$C_{10}$Phenylalkyl which is substituted on the phenyl group by $C_1$–$C_{20}$alkyl, preferably $C_8$–$C_{14}$alkyl, is one of the preferred meanings. A further example which may be mentioned is dodecylbenzyl.

$C_2$–$C_4$Alkanoyl is, for example, acetyl, propanoyl or butanoyl. Acetyl is preferred.

$C_2$–$C_4$Alkoxycarbonyl is, for example, methoxycarbonyl, ethoxycarbonyl or propoxycarbonyl. Methoxycarbonyl and ethoxycarbonyl are preferred.

Di($C_1$–$C_4$alkyl)amino is, for example, dimethylamino, diethylamino, dipropylamino or dibutylamino.

$C_1$–$C_{20}$Alkylamino, preferably $C_1$–$C_8$alkylamino, in particular $C_4$–$C_8$alkylamino, is, for example, butylamino, pentylamino, hexylamino, heptylamino or octylamino.

$C_3$–$C_8$Cycloalkylamino is, for example, cyclopropylamino, cyclohexylamino or cyclooctylamino.

Alkylene having up to 12 carbon atoms is, for example, methylene, dimethylene, trimethylene, butylene, pentamethylene, hexamethylene, octamethylene, decamethylene or dodecamethylene. Alkylene having up to 8 carbon atoms is preferred. A summary is given in U.S. Pat. No. 5,155,152.

Further possible additional additives are compounds of the formulae a and b

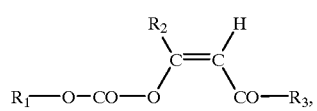
(a)

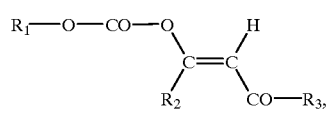
(b)

in which $R_1$ is $C_1$–$C_{22}$alkyl, phenyl, mono- or di-$C_1$–$C_9$alkyl-substituted phenyl, $C_5$–$C_7$cycloalkyl or a group of the formula A or B

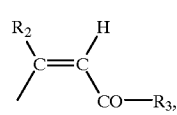
(A)

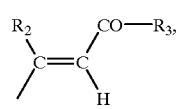
(B)

or $R_1$ is a group of the formula ca or cb

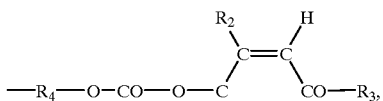
(ca)

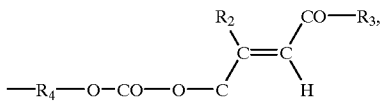
(cb)

in which $R_2$ and $R_3$, independently of one another, are $C_1$–$C_{20}$alkyl, phenyl, mono- or di-$C_1$–$C_9$alkyl-substituted phenyl or $C_5$–$C_7$cycloalkyl, and $R_4$ is $C_2$–$C_{12}$alkylene. More detailed explanations, examples and preferences are given in EP 224 438.

Further additives which can be used are triazoles of the formula

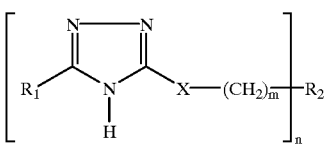

or of the formula

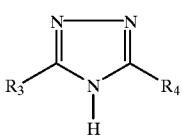

in which $R_1$ is hydrogen, hydroxyl, $C_1$–$C_6$alkoxy, carboxyl, $C_2$–$C_6$alkoxycarbonyl, mercapto, $C_1$–$C_6$alkylthio, —S—$CH_2$—COOH or —S—$CH_2$—COO—$C_1$–$C_6$alkyl, X is thio, methylene, —COO— or —S—$CH_2$—COO—, in each case bonded to the alkyl via the ester oxygen atom, m is an integer from 1 to 20, n is 1 or 2, $R_2$, if monovalent, is hydrogen, hydroxyl or mercapto and, if divalent, is a direct bond, imino, $C_1$–$C_6$alkylimino, oxy, thio or methylene, $R_3$ is hydrogen, amino, mercapto or $C_1$–$C_{12}$alkylthio, and, if $R_3$ is hydrogen, $R_4$ is hydrogen, —COO$R_5$, in which $R_5$ is hydrogen, $C_1$–$C_8$alkyl or —$CH_2$—COO—$C_1$–$C_8$alkyl, or —S—$R_6$, where $R_6$ is hydrogen, $C_1$–$C_{12}$alkyl, —$CH_2$—COO—$C_1$–$C_8$alkyl or $C_1$–$C_{12}$alkylthio, or is

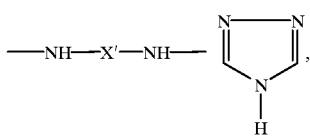

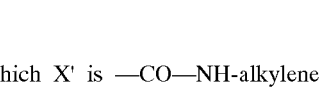

in which X' is —CO—NH-alkylene-NH—CO—, —CO-alkylene-S-alkylene-CO—, each having 1–12 carbon atoms in the alkylene chain, or $C_1$–$C_{12}$alkylene, if $R_3$ is $NH_2$, $R_4$ is $C_1$–$C_4$alkyl, mercapto, $C_1$–$C_4$alkylthio or

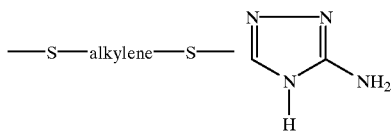

having 1–12 carbon atoms in the alkylene chain, if $R_3$ is mercapto, $R_4$ is substituted or unsubstituted phenyl, and if $R_3$ is $C_1$–$C_{12}$alkylthio, $R_4$ is $C_1$–$C_4$alkyl, $C_1$–$C_{12}$alkylthio or substituted or unsubstituted phenyl.

Such additives, further embodiments, examples and preferences are given in DE 3 048 659.

It is also possible to use additive mixtures consisting of a thioether of the formula (VIII)

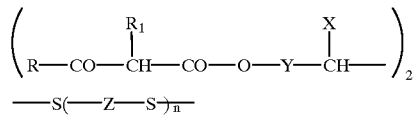
(VIII)

in which n is the number 0 or 1,

R is $C_1$–$C_{18}$alkyl, $C_5$–$C_8$cycloalkyl, or unsubstituted or $C_1$–$C_4$alkyl-substituted $C_6$–$C_{10}$aryl, $R_1$ is hydrogen or $C_1$–$C_4$alkyl, X, as a recurring symbol, in each case identical to or different from the others, is hydrogen or a group of the formula

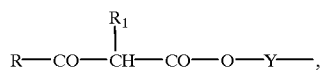

Y, as a recurring symbol, in each case identical to or different from the others, is $C_1$–$C_6$alkylene or a group of the formula

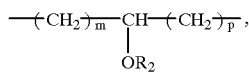

where the

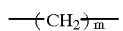

group is bonded to the oxygen atom and in which $R_2$ is hydrogen or a group of the formula

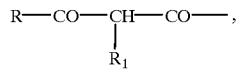

n can be a number from 1 to 4 and p can be a number from 0 to 3, Z is $C_1$–$C_6$alkylene or a group of the formula

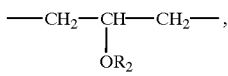

and b) a stabilizer containing a metal from the group consisting of zinc, calcium and magnesium or alternatively zinc combined with at least one of the abovementioned metals.

Further information in this regard, examples and preferences are given in EP 19 576.

It is also possible to use additives of the formula (IX

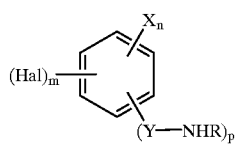
(IX)

in which m is the number 0, 1 or 2, n is the number 0, 2 or 3, p is the number 1 or 2, Hal is —F, —Cl, —Br or —I, X is —$NH_2$, —$NHCH_3$ and/or —$OCH_3$ or $OC_2H_5$, Y is —CO— or —$SO_2$—, and R is —H, —OH, —$NH_2$, $C_1$–$C_{18}$alkyl which is unsubstituted or substituted, for example, by one to three HO- and/or $C_1$–$C_4$alkoxy or phenoxy groups, phenyl, benzyl or phenethyl, or R is furthermore a group of the formula

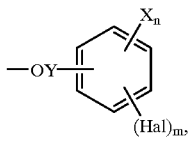

where X, Y, m, n and Hal are as defined above. Detailed descriptions, examples and preferences are given in EP 122 228 and EP 174 412.

It is also possible to use additive mixtures obtainable by mixing at least one compound of the formula (X)

(X)

in which X is O or S, n is an integer from 1 to 5, and R is straight-chain or branched $C_1$–$C_{18}$alkyl or substituted or unsubstituted cyclohexyl, and at least one additive of the Me(II) carboxylate and/or Me(II) phenoxide type, where Me(II) is one or more metals from the series consisting of Sr, Ca, Mg and Zn, and where, based on the halogen-containing polymer, 0.01–2% by weight of the compound of the formula X and 0.1–4% by weight of the Me(II) carboxylate and/or Me(II) phenoxide are employed. Stabilizer mixtures of this type are described in greater detail in EP 90 770, which also contains examples and preferences.

Suitable dihydropyridines are monomeric and oligomeric compounds, for example as described in EP-A-0 362 012, EP-A-0 286 887 and EP-A-0 024 754.

Examples of suitable antioxidants are:

1. Alkylated monophenols, for example 2,6-di-tert-butyl-4-methylphenol, 2-butyl-4,6-dimethylphenol, 2,6-di-tertbutyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, octylphenol, nonylphenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

4. Hydroxylated diphenyl thioethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

5. Alkylidenebisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methyl-phenyl] terephthalate, 1,1-bis(3,5-dimethyl-2-hydroxyphenyl)butane, 2,2-bis(3,5-di-tert-butyl-4-hydroxyphenyl)propane, 2,2-bis(4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

6. O-, N- and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate.

7. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4-(1,1,3,3-tetramethylbutyl)phenyl]2,2-bis(3,5-di-tert-butyl-4-hydroxybenzyl)malonate.

8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

9. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

10. Phosphonates, phosphites and phosphonites, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of monoethyl 3,5-i-tert-butyl-4-hydroxybenzyl phosphonate, triphenyl phosphite, diphenyl alkyl phosphites, phenyl dialkyl phosphites, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis(2,4-di-tert-butylphenyl) pentaerythrityl diphosphite, bis(2,6-di-tert-butyl-4-methylphenyl) pentaerythrityl diphosphite, bisisodecyloxy pentaerythrityl diphosphite, bis(2,4i-tert-butyl-6-methylphenyl) pentaerythrityl diphosphite, bis(2,4,6-tri-tert-butylphenyl) pentaerythrityl diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyldibenz[d,g]-1,3,2-dioxaphosphocine, bis(2,4-di-tert-butyl-6-methylphenyl) methyl phosphite, bis(2,4-di-tert-butyl-6-methylphenyl) ethyl phosphite $(C_9H_{19}-C_6H_4)_{1.5}-P-(O-C_{12-13}H_{25-27})_{1.5}$.

11. Acylaminophenols, for example 4-hydroxylauranilide, 4-hydroxystearanilide, octyl N-(3,5-di-tert-butyl-4-hydroxyphenyl)carbamate.

12. Esters of β-(3,5-di-tert-butyl-4-hydroxyphenyl) propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

13. Esters of O-(5-tert-butyl-4-hydroxy-3-methylphenyl) propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

14. Esters of 13-(3,5-dicvclohexyl-4-hydroxyphenyl) propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl- 1-phospha-2,6,7-trioxabicyclo-[2.2.2]-octane.

15. Esters of 3,5-di-tert-butyl-4-hydroxyphenylacetic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

16. Amides of β-(3,5-di-tert-butyl-4-hydroxyphenyl) propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

17. Esters of thiodiacetic acid and thiodipropionic acid

Preference is given to antioxidants from groups 5, 10 and 14, in particular 2,2-bis(4-hydroxyphenyl)propane, esters of 3,5-di-tert-butyl-4-hydroxyphenylpropionic acid with octadecanol or pentaerythritol, or tris(2,4-di-tert-butylphenyl) phosphite.

If desired, a mixture of antioxidants of different structures can also be employed.

The antioxidants can be used in an amount of, for example, 0.01 to 10 parts by weight, preferably from 0.1 to 10 parts by weight, in particular from 0.1 to 5 parts by weight, based on 100 parts by weight of polymer Examples of suitable UV absorbers and light stabilizers are:

1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-tert-amyl-2'-hydroxyphenyl)benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-yl phenol]; transesterification product of 2-[3'-tert-butyl-5'-(2-methoxycarbonylethyl)-2'-hydroxyphenyl]benzotriazole with polyethylene glycol 300; [R—CH₂CH₂—COO(CH₂)₃]₂ where R=3'-tert-butyl-4'-hydroxy-5'-2H-benzotriazol-2-yl phenyl.

2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl and isooctyl α-cyano-β,β-diphenylacrylate, methyl α-carbomethoxycinnamate, methyl and butyl α-cyano-β-methyl-p-methoxycinnamate, methyl α-carbomethoxy-p-methoxycinnamate and N-(β-carbomethoxy-β-cyanovinyl)-2-methylindoline.

5. Nickel compounds, for example nickel complexes of 2,2'-thiobis[4-(1,1,3,3-tetramethylbutyl)phenol], such as the 1:1 and 1:2 complexes, if desired with additional ligands, such as n-butylamine, triethanolamine or N-cyclohexyldiethanolamine, nickel dibutyldithiocarbamate, nickel salts of monoalkyl esters, such as the methyl or ethyl esters, of 4-hydroxy-3,5-di-tert-butylbenzylphosphonic acid, nickel complexes of ketoximes, such as of 2-hydroxy-4-methylphenyl undecyl ketoxime, and nickel complexes of 1-phenyl-4-lauroyl-5-hydroxypyrazole, if desired with additional ligands.

6. Sterically hindered amines, for example bis(2,2,6,6-tetramethylpiperidyl) sebacate, bis(2,2,6,6-tetramethylpiperidyl) succinate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the product of the condensation of 1-hydroxyethyl-2,2,6,6-tetramethyl-4-hydroxypiperidine and succinic acid, the product of the condensation of N,N'-bis(2,2,6,6-tetramethyl-4-piperidyl) hexamethylenediamine and 4-tert-octylamino-2,6-dichloro-1,3,5-s-triazine, tris(2,2,6,6- tetramethyl-4-piperidyl) nitrilotriacetate, tetrakis(2,2,6,6-tetramethyl-4-piperidyl) 1,2,3,4-butanetetraoate, 1,1'-(1,2-ethanediyl) bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl) 2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(l-octyloxy-2,2,6,6-tetramethylpiperidyl) succinate, the product of the condensation of N,N'-bis(2,2,6,6-tetramethyl-4-piperidyl)hexamethylene diamine and 4-morpholino-2,6-dichloro-1,3,5-triazine, the product of the condensation of 2-chloro-4,6-di(4-n-butylamino-2,2,6,6-tetramethylpiperidyl)1,3,5-triazine and 1,2-bis(3-aminopropylamino) ethane, the product of the condensation of 2-chloro-4,6- di(4-n-butylamino-1,2,2,6,6-pentamethylpiperidyl)-1,3, 5-triazine and 1,2-bis(3-aminopropylamino)ethane, 8-acetyl-3-dodecyl-7,7,9,9-tetramethyl-1,3,8-triazaspiro [4.5]decane-2,4-dione, 3-dodecyl-1-(2,2,6,6-tetramethyl-4-piperidyl)pyrrolidine-2,5-dione, 3-dodecyl-1-(1,2,2,6, 6-pentamethyl-4-piperidyl)pyrrolidine-2,5-dione and Chimassorb 966.

7. Oxalamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and mixtures thereof with 2-ethoxy-2'-ethyl-5,4'-di-tert-butyloxanilide, and mixtures of o- and p-methoxy- and of o- and p-ethoxy-disubstituted oxanilides.

8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy4-dodecyloxyphenyl)-4,6-bis(2,4-dimethylphenyl)-1,3,5-triazine, 2-[2-hydroxy-4-(2-hydroxy-3-butoxypropoxy)phenyl]-4,6-bis(2,4-dimethylphenyl)-1,3,5-triazine, 2-[2-hydroxy-4-(2-hydroxy-3-octyloxypropoxy)phenyl]-4,6-bis(2,4-dimethylphenyl)-1,3,5-triazine.

Examples of suitable peroxide scavengers are: esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulfide, pentaerythritol tetrakis(β-dodecylmercapto)propionate and ethylene glycol bismercaptoacetate.

Examples of suitable lubricants are:

montan wax, fatty acid esters, PE waxes, polyol partial esters, partially hydrolysed PE waxes, complex esters, chlorinated paraffins, glycerol esters, alkaline earth metal soaps or fatty ketones, as described in DE 4 204 887. Suitable lubricants are also described in "Taschenbuch der Kunststoff-Additive" [Handbook of PLastics additives], edited by R. Gächter and H. Müller, Hanser Verlag, 3rd Edition, 1990, pages 443–503. Further lubricant variants, in particular combinations, are given in EP 0 062 813 and EP 0 336 289.

Examples of suitable polyols are:

pentaerythritol, dipentaerythritol, tripentaerythritol, trimethylolethane, bistrimethylolethane, trimethylolpropane, bistrimethylolpropane, sorbitol, mannitol, xylitol, lactose, maltitol, malbitol, lactitol, palatinitol, isomaltitol, isomaltol, leucrose, dihydroleucrose, glycopyranosyl-sorbitol, glucopyranosyl-mannitol, lycasine, tris(hydroxyethyl) isocyanurate, tris(dihydroxypropyl) isocyanurate, inositols, tetramethylolcyclohexanol, tetramethylolcyclopentanol, tetramethylolcyclopyranol, glycerol, diglycerol, polyglycerol, thiodiglycol, thiodiglycerol, bishydroxyethyltartaramide, hexakishydroxyethylmelamine, bistrihydroxymethyloxalamide, tristrihydroxymethyl-citramide and α,β- and γ-cyclodextrins.

The polyols can be used in an amount of, for example, from 0.01 to 20 parts by weight, preferably from 0.1 to 20 parts by weight, in particular from 0.1 to 10 parts by weight, based on 100 parts by weight of polymer.

Suitable compounds from the series consisting of the hydrotalcites, zeolites, dawsonites, magadiites, kenyaites or kanemites are both naturally occurring minerals and synthetic compounds.

Compounds from the series consisting of the hydrotalcites can be described by the general formula (XIII), $$M^{2+}_{1-x}.M^{3+}_{x}.(OH)_2.(A^{n-})_{x/n}.mH_2O \quad (XIII)$$

where $M^{2+}$=Mg, Ca, Sr, Zn, and/or Sn, $M^{3+}$=Al, B or Bi, $A^n$ is an anion having the valency n, n is a number from 1 to 4, x is a number from 0 to 0.5, m is a number from 0 to 20.

$A^n$ is preferably $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$, $$\begin{array}{c} COO^- \\ | \\ COO^- \end{array},$$

$(CHOHCOO)_2^{2-}$, $(CHOH)_4CH_2OHCOO^-$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$, $HPO_3^{2-}$ or $HPO_4^{2-}$;

Further examples are given in DE 4 106 403.

Other hydrotalcites which can preferably be used are compounds having the general formula (XIIIa)

$$M_x^{2+}Al_2(OH)_{2x+6nz}(A^{n-})_2.mH_2O \quad (XIIIa)$$

where $M^{2+}$ is at least one metal from the series consisting of M and Zn, preferably Mg, $A^{n-}$ is an anion, for example from the series consisting of $CO_3^{2-}$, $$\begin{pmatrix} COO \\ | \\ COO \end{pmatrix}^{2-},$$

$OH^-$ and $S^{2-}$, where n is the valency of the anion, m is a positive number, preferably 1.5 to 15, and x and z are positive numbers, x preferably being from 2 to 6 and z preferably being less than 2.

Preference is given to compounds from the series consisting of the hydrotalcites of the general formula (XIII), $$M^{2+}_{1-x}.M^{3+}_{x}.(OH)_2.(A^{n-})_{x/n}.mH_2O \quad (XIII)$$

where $M^{2+}$ is Mg or a solid solution of Mg and Zn, $A^{n-}$ is $CO_3^{2-}$, x is a number from 0 to 0.5, and m is a number from 0 to 20.

Very particular preference is given to hydrotalcites of the formulae $Al_2O_3.6MgO.CO_2.12H_2O$, $Mg_{4.5}Al_2(OH)_{13}.CO_3.3.5H_2O$, $4MgO.Al_2O_3.CO_2.9H_2O$, $4MgO.Al_2O_3.CO_2.6H_2O$, $ZnO.3MgO.Al_2O_3.CO_2.8-9H_2O$ or $ZnO.3MgO.Al_2O_3CO_2.5-6H_2O$.

Zeolites can be described by the general formula (XIV)

$$M_{x/n}[(AlO_2)_x(SiO_2)y].wH_2O \quad (XIV)$$

where n is the charge of the cation M,

M is an element from the first or second main group, or zinc, y:x is a number between 0.8 and infinity, preferably between 0.8 and 10.5, and w is a number between 0 and 300.

Furthermore, zeolites which can be used are disclosed in "Atlas of Zeolite Structure Types", W. M. Meier and D. H. Olson, Butterworths, 3rd Edition, 1992.

Zeolites in a broader sense also include aluminium phosphates having a zeolite structure.

The preferred zeolites which are known per se have an average effective pore diameter of 3–5 Å and can be prepared by known methods. Particular preference is given to zeolites of type NaA which have an average effective pore diameter of 4 Å, and are therefore known as zeolites 4A.

Particular preference is given to crystalline sodium aluminosilicates whose particle size is at least predominantly in the range from 1–10 μm.

In a preferred embodiment, sodium aluminosilicates having rounded corners and edges can also be used.

Preference is given to compounds of the formulae $Na_{12}Al_{12}Si_{12}O_{48}.27\ H_2O$ [zeolite A], $Na_6Al_6Si_6O_{24}.2\ NaX\ 7.5\ H_2O$, X=OH, halogen, $CiO_4$ [sodalite]

$Na_6Al_6Si_{30}O_{72}.24\ H_2O$, $Na_8Al_8Si_{40}O_{96}.24\ H_2O$, $Na_{16}Al_{16}Si_{24}O_{80}.16\ H_2O$, $Na_{16}Al_{16}Si_{32}O_{96}.16\ H_2O$, $Na_{56}Al_{56}Si_{136}O_{384}.250\ H_2O$, [zeolite Y]

$Na_{86}Al_{86}Si_{106}O_{384}.264\ H_2O$ [zeolite X]

or the zeolites which can be prepared by replacement of all or some of the sodium atoms by lithium, potassium, magnesium, calcium, strontium or zinc atoms, such as $(Na,K)_{10}Al_{10}Si_{22}O_{64}.20\ H_2O$.

$Ca_{4.5}Na_3[(AlO_2)_{12}(SiO_2)_{12}].30\ H_2O$ $K_9Na_3[(AlO_2)_{12}(SiO_2)_{12}].27\ H_2O$.

Suitable dawsonites or general alumo salt compounds, for example of the formula (XV) $\{(Mt_2O)_m.(Al_2O_3)_n.Z_o.pH_2O\}$, in which Mt is H, Na, K, Li, $Mg_{1/2}$, $Ca_{1/2}$, $Sr_{1/2}$ or $Zn_{1/2}$; Z is $CO_2$, $SO_2$, $(Cl_2O_7)_{1/2}$, $B_4O_6$, $S_2O_2$ (thiosulfate) or $C_2O_2$ (oxalate); m is a number from 1 to 3; n is a number from 1 to 4; o is a number from 2 to 4; and p is a number from 0 to 30; can be naturally occurring minerals or synthetic compounds. The metals can have been partially replaced by one another. Said dawsonites are crystalline, partially crystalline or amorphous or can be in the form of a dried gel. The dawsonites can also exist in rarer crystalline modifications. A process for the preparation of such compounds is given in EP 0 394 670. Examples of naturally occurring alumo salt compounds are indigirite, tunisite, alumohydrocalcite, para-alumohydrocalcite, strontiodresserite and hydrostrontiodresserite. Further examples of alumo salt compounds are potassium alumocarbonate $\{(K_2O).(Al_2O_3).(CO_2)_2.2H_2O\}$, sodium alumothiosulfate $\{(Na_2O).(Al_2O_3).(S_2O_2)_2.2H_2O\}$, potassium alumosulfite $\{(K_2O).(Al_2O_3).(SO_2)_2.2H_2O\}$, calcium alumooxalate $\{(CaO).(Al_2O_3).(C_2O_2)_2.5H_2O\}$, magnesium alumotetraborate $\{(MgO).(Al_2O_3).(B_4O_6)_2.5H_2O\}$, $\{([Mg_{0.2}Na_{0.6}]_2O)(Al_2O_3).(CO_2)_2.4,1H_2O\}$, $\{([Mg_{0.2}Na_{0.6}]_2O).(Al_2O_3).(CO_2)_2.4,3H_2O\}$ and $\{([Mg_{0.3}Na_{0.4}]_2O).(Al_2O_3).(CO_2)_{2.2}.4,9H_2O\}$.

A suitable compound is a magadiite of the formula $Na_2Si_{14}O_{29}.n\ H_2O$ or $Na_2Si_8O_{17}.n\ H_2O$, in which n is a number from 0 to 30.

A suitable compound is a kenyaite of the formula $Na_2Si_{22}O_{45}.n\ H_2O$, in which is a number from 0 to 30.

A suitable compound is a kanemite of the formula $Na_2Si_2O_5.n\ H_2O$, $NaHSi_2O_5.n\ H_2O$ or $Na_2Si_4O_9.n\ H_2O$, in which n is a number from 0 to 30.

The magadiites, kenyaites and kanemites which can be used can be naturally occurring minerals or synthetic compounds. A process for the preparation of such compounds is given, for example, in EP 0 472 144, EP 0 615 955, EP 0 615 956, EP 0 627 383 and DE 41 07 955.

The mixed alumo salt compounds can be obtained by processes known per se by cation exchange processes known per se, preferably from the alkali metalvalumo salt compounds, or by combination precipitation (see, for example, U.S. Pat. No. 5,194,458).

Preference is given to alumo salt compounds of the formula (XV) in which Mt is Na or K; Z is $CO_2$, SO or $(Cl_2O_7)_{1/2}$; m is 1–3; n is 1–4; o is 2–4 and p is 0–20. Z is particularly preferably $CO_2$.

Preference is furthermore given to compounds which can be represented by the following formulae:

  (XVa)

  (XVb)

  (XVc)

in which Mt is a metal, such as Na, K, $Mg_{1/2}$, $Ca_{1/2}$, $Sr_{1/2}$ or $Zn_{1/2}$ and p is a number from 0 to 12.

Preference is furthermore given to a magadiite of the formula $Na_2Si_{14}O_{29}.6\ H_2O$ and a kenyaite of the formula $Na_2Si_{22}O_{45}.7\ H_2O$.

Compounds from the series consisting of the hydrotalcites, zeolites, dawsonites, magadiites, kenyaites and kanemites can be used in an amount of, for example, from 0.01 to 30 parts by weight, preferably from 0.1 to 20 parts by weight, in particular from 0.1 to 10 parts by weight, particularly preferably from 0.1 to 5 parts by weight, based on 100 parts by weight of polymer.

Preference is given to a composition comprising (a) PVC, (b) a polyoxyalkylene of the formula $R_1—O—[CH(R_3)—CH_2—O—]_n—[CH_2—[CH(OH)]_p—CH_2—O]_q—[C(O)]_r—R_2$ (I), where $R_1$ is H, $C_1$–$C_{24}$alkyl, $C_2$–$C_{24}$alkenyl, $CH_2$=CH—C(O) or $CH_2$=$CCH_3$—C(O), $R_2$ is $C_1$–$C_{24}$alkyl, $C_2$–$C_{24}$alkenyl, CH—COOH or $N(C_1$–$C_8$alkyl$)_3$Hal, $R_3$ is H or $CH_3$, Hal is Cl, Br or I, n is a number greater than or equal to 2, p is a number from 1 to 6, and q and r, independently of one another, are 0 or 1; and (c) less than 10 parts by weight, per 100 parts of PVC, of an inorganic salt of the formula 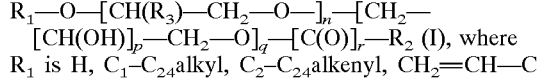, where M is a z-valent alkali metal cation, alkaline earth metal cation or zinc cation, a and b, independently of one another, are a number from 1 to 6, and A is an anion of an inorganic protic acid or of an organic oxo acid of sulfur, where the composition contains no ammonium perchlorate.

Particular preference is given to a composition in which component (a) is flexible PVC.

Particular preference is also given to the composition in which component (b) is a polyethylene glycol lauryl ester.

Preference is furthermore given to a composition which additionally comprises an inorganic or organic zinc, barium, lead, cadmium, aluminium, calcium, magnesium or rare-earth compound or a mixture of at least two of these compounds.

Preference is furthermore given to a composition which additionally comprises a tin compound.

Preference is furthermore given to a compound which additionally comprises a phenolic antioxidant, in particular from 0.1 to 5.0 parts per 100 parts of polymer.

Preference is furthermore given to a composition which additionally comprises a 1,3-diketone and/or a barium, magnesium, calcium, aluminium or zinc salt thereof or a 1,3-keto ester.

Preference is furthermore given to a composition which additionally comprises an epoxide.

Preference is furthermore given to a composition which additionally comprises a monomeric, oligomeric or polymeric dihydropyridine.

Preference is furthermore given to a composition which additionally comprises a phosphite, a polyol, a hydrotalcite, a zeolite, a dawsonite, a magadiite, a kenyaite or a kanemite.

Particular preference is given to a composition which additionally comprises an inorganic or organic zinc, barium, cadmium, aluminium, calcium, magnesium or rare-earth compound or a mixture of at least two of these compounds, a 1,3-diketone and/or a barium, magnesium, calcium, aluminium or zinc salt thereof, or a 1,3-keto ester and a monomeric, oligomeric or polymeric dihydropyridine.

Particular preference is given to a composition which additionally comprises an inorganic or organic zinc, barium, cadmium, aluminium, calcium, magnesium or rare-earth compound or a mixture of at least two of these compounds, a 1,3-diketone and/or a barium, magnesium, calcium, aluminium or zinc salt thereof, or a 1,3-keto ester, a monomeric, oligomeric or polymeric dihydropyridine and a tin compound.

Particular preference is given to a composition which additionally comprises an inorganic or organic zinc, barium, cadmium, aluminium, calcium, magnesium or rare-earth compound or a mixture of at least two of these compunds, a 1,3-diketone and/or a barium, magnesium, calcium, aluminium or zinc salt thereof, or a 1,3-keto ester and a polyol, a hydrotalcite, a zeolite, a dawsonite, a magadiite, a kenyaite or a kanemite.

All the combinations may additionally comprise a lubricant.

The present invention furthermore relates to an additive mixture comprising a polyoxyalkylene of the formula $R_1$—O—[CH($R_3$)—$CH_2$—O—]$_n$—[$CH_2$— [CH(OH)]$_p$—$CH_2$—O]$_q$—[C(O)]$_r$—$R_2$ (I), where $R_1$ is H, $C_1$–$C_{24}$alkyl, $C_2$–$C_{24}$alkenyl, $CH_2$=CH—C(O) or $CH_2$=$CCH_3$—C(O), $R_2$ is $C_1$–$C_{24}$alkyl, $C_2$–$C_{24}$alkenyl, CH—COOH or N($C_1$–$C_8$alkyl)$_3$Hal, $R_3$ is H or $CH_3$, Hal is Cl, Br or I, n is a number greater than or equal to 2, p is a number from 1 to 6, q and r, independently of one another, are 0 or 1;

an inorganic salt of the formula {$M^{z+}_a A^{(az/b)-}_b$}, where

M is a z-valent alkali metal cation, alkaline earth metal cation or zinc cation, a and b, independently of one another, are a number from 1 to 6, and A is an anion of an inorganic protic acid or of an organic oxo acid of sulfur, where the composition contains no ammonium perchlorate. The abovementioned preferences apply to the individual mixture constituents, and the additive mixture can likewise comprise the other constituents described above.

The present invention furthermore relates to the use of a polyoxyalkylene of the formula $R_1$—O—[CH($R_3$)—$CH_2$—O—]$_n$—[$CH_2$— [CH(OH)]$_p$—$CH_2$—O]$_q$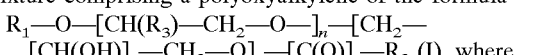—$R_2$ (I), where $R_1$ is H, $C_1$–$C_{24}$alkyl, $C_2$–$C_{24}$alkenyl, $CH_2$=CH—C(O) or $CH_2$=$CCH_3$—C(O), $R_2$ is $C_1$–$C_{24}$alkyl, $C_2$–$C_{24}$alkenyl, CH—COOH or N($C_1$–$C_8$alkyl)$_3$Hal, $R_3$ is H or $CH_3$, Hal is Cl, Br or I, n is a number greater than or equal to 2, p is a number from 1 to 6, and q and r, independently of one another, are 0 or 1;

in combination with an inorganic salt of the formula {$M^{z+}_a A^{(az/b)-}_b$}, where M is a z-valent alkali metal cation, alkaline earth metal cation or zinc cation, a and b, independently of one another, are a number from 1 to 6, and A is an anion of an inorganic protic acid or of an organic oxo acid of sulfur, where no ammonium perchlorate is present, for improving the antistatic properties of a halogen-containing polymer. The abovementioned preferences apply to the individual compounds and to the halogen-containing polymer itself, and in addition one of the other constituents described above can likewise be used.

The novel composition can be prepared in a manner known per se using equipment known per se, such as calenders, mixers, compounders, extruders and the like, to mix said additives and, if desired, further additives with the halogen-containing polymer or flexible polymer. The additives can be added individually or as a mixture with one another. It is also possible to use masterbatches.

The antistatic halogen-containing polymer obtainable in accordance with the present invention can be converted into the desired shape in a known manner. Methods of this type are, for example, grinding, calendering, extrusion, injection moulding, sintering, press sintering or spinning, furthermore extrusion blow moulding or conversion by the plastisol process. The antistatic halogen-containing polymer can also be converted into foams.

The novel halogen-containing polymer is particularly suitable for semirigid and flexible formulations, in particular in the form of flexible formulations for wire sheaths and cable insulations, which is particularly preferred. In the form of semirigid formulations, the novel halogen-containing polymer is particularly suitable for decorative films, foams, agricultural sheeting, tubes, sealing profiles and office films.

In the form of rigid formulations, the halogen-containing polymers stabilized in accordance with the invention is particularly suitable for hollow articles (bottles), packaging films (thermoformable films), blown films, crash-pad films (automobiles), tubes, foams, heavy profiles (window frames), light-wall profiles, construction profiles, sidings, fittings, office films and equipment casings (computers and domestic appliances). Examples of the use of the novel halogen-containing polymer as plastisol are artificial leather, floor coverings, textile coatings, wall coverings, coil coatings and automotive underseal.

Examples of sinter applications of the halogen-containing polymer stabilized in accordance with the invention are slush, slush mould and coil coatings.

The examples below illustrate the invention in greater detail. Parts and percentages are, as in the remainder of the description, by weight, unless stated otherwise. Numerical ranges, as in the remainder of the description, include the limits.

EXAMPLES 1–4

A PVC composition is prepared by mixing the individual components as shown in Table 1 below (amounts in parts by weight).

The constituents are homogenized for 10 minutes on a mixing roll at 180° C. giving a film with a thickness of 0.3–0.5 mm.

The long-term stability is determined in accordance with DIN 53381, the sample being kept in a test oven at 190° C. for 25 minutes and the Yellowness Index being determined in accordance with ASTM D 1925-70 (test 1).

The surface resistance is determined after storage of the films for 24 hours at 23° C. and standard relative humidity of 50% in accordance with DIN 53 482 (test 3). The measurement voltage used is 1000 V. The results are expressed as the mean taken from 10 individual measurements.

The long-term stability and surface resistance are re-measured after the films have been stored under tropical conditions (4 weeks at 70° C. and 95% relative humidity) (test 2 and test 4). The individual measurements are carried out as outlined for tests 1 and 3.

TABLE 1

| Component | C 1 | Ex. 1 | Ex. 2 | Ex. 3 | Ex. 4 |
|---|---|---|---|---|---|
| PVC 1 | 100 | 100 | 100 | 100 | 100 |
| P 1 | 48 | 44 | 44 | 44 | 44 |
| L 1 | 0.2 | 0.2 | 0.2 | 0.2 | 0.2 |
| ESO | 2 | 2 | 2 | 2 | 2 |
| ST 1 | 2 | 2 | 2 | 2 | 2 |
| B 1 | 4 | 4 | 4 | 4 | 4 |
| C 1 | — | 0.2 | 0.4 | — | — |
| C 2 | — | — | — | 0.1 | 0.4 |
| Test 1 | 9 | 7 | 7 | 8 | 8 YI |
| Test 2 | >100 | 40 | 27 | — | — YI |
| Test 3 | 94 | 10 | 5 | 20 | 6 [*] |
| Test 4 | 104 | 10 | 5 | 16 | 4 [*] |

* $.10^9$ Ohm

EXAMPLES 5 and 6

A PVC composition is prepared by mixing the individual components as shown in Table 2 below (amounts in parts by weight). The samples are prepared and the measurements carried out as described for Examples 1–4.

TABLE 2

| Component | C-2 | C-3 | Ex. 5 | C-4 | Ex. 6 |
|---|---|---|---|---|---|
| PVC 1 | — | — | — | 100 | 100 |
| PVC 2 | 100 | 100 | 100 | — | — |
| P 1 | 15 | 3 | 11 | 28 | 24 |
| P 2 | 80 | 80 | 80 | — | — |
| ESO | — | — | — | 3 | 3 |
| ST 2 | 2 | 2 | 2 | — | — |
| ST 3 | — | — | — | 2.5 | 2.5 |
| B 1 | — | 12 | 4 | — | 4 |
| C 2 | — | — | 0.4 | — | 0.4 |
| Test 3 | 110* | 0.31* | 0.29* | 14** | 0.37** |

* $.10^9$ Ohm
** $.10^{12}$ Ohm

EXAMPLES 7–16

A PVC composition is prepared by mixing the following components as described in Examples 1–4: 100 parts of PVC 1; 44 parts of P 1, 0.2 part of L 1, 2 parts of ESO and 2 parts of ST 1.

The constituents and those shown in Table 3 are homogenized for 10 minutes on a roll mill at 180° C., giving a film with a thickness of 0.38 mm.

The volume resistance is determined in accordance with DIN 53 482 after the films have been stored for at least 24 hours at 21.5° C. and 50% relative atmospheric humidity. The measurement is carried out using a circular plate electrode (diameter 50 mm) with protective ring (diameter internal 60 mm; diameter external 80 mm). The measurement is carried out at 100 volts and the current is read off after one minute. The volume resistivity RD is calculated from these values.

In order to test the effect of humidity, the films are measured both at 21.5° C. and 50% relative atmospheric humidity and in an atmosphere of dry nitrogen. The measurement is carried out on a quartz plate using the Electrotech Systems resistance indicator model 870 with conductive rubber electrodes. The increase in the resistance is shown in Table 3 as 'the drying factor F=R(dry)/R(50% rel. humidity).

TABLE 3

| Ex. | Components | $R_D$ | F |
|---|---|---|---|
| 7 | 3% B 1 and 0.2% C-1 | 5.0* | 1.50 |
| 8 | 3% B 1 and 0.15% C-2 | 7.4* | 1.53 |
| 9 | 3% B 1 and 0.5% C-3 | 4.1* | 1.67 |
| 10 | 3% B 1 and 0.2% C-4 | 6.2* | 2.10 |
| 11 | 3% B 1 and 0.2% C-5 | 11* | 1.86 |
| 12 | 3% B 2 and 0.2% C-1 | 4.0* | 1.41 |
| 13 | 3% B 2 and 0.2% C-2 | 5.0* | 1.29 |
| 14 | 3% B 2 and 0.5% C-3 | 2.6* | 2.05 |
| 15 | 3% B 2 and 0.2% C-4 | 9.0* | 1.71 |
| 16 | 3% B 2 and 0.2% C-5 | 1.5* | 2.26 |

* $.10^{10}$ Ohm.cm

EXAMPLES C4, C5, 17 and 18

A PVC composition is prepared as described in Example 1 by mixing the components shown in Table 4 (amounts in parts by weight). The surface resistance is measured in accordance with DIN 53 482 in ohms.

TABLE 4

| | C4 | C5 | Ex. 17 | Ex. 18 |
|---|---|---|---|---|
| PVC 1 | 100.0 | 100.00 | 100.00 | 100.00 |
| Chalk:OMYA EXH 1 | 133.00 | 133.00 | 133.00 | 133.00 |
| P 1 | 34.00 | 31.00 | 31.00 | 31.00 |
| St 4 | 3.30 | 3.30 | 3.30 | 3.30 |
| B 1 | | 3.30 | | |
| BC 1 | | | 2.90 | |
| BC 2 | | | | 3.30 |
| Surface resistance in ohms | $1.03 \times 10^{13}$ | $4.39 \times 10^{12}$ | $3.45 \times 10^{11}$ | $8.91 \times 10^{10}$ |

EXAMPLES C6, C7, C8g and 19 to 24

A PVC composition is prepared as described in Example 1 by mixing the components shown in Table 5 (amounts in parts by weight). The surface resistance is measured in accordance with DIN 53 482.

TABLE 5

| | C6 | C7 | C8 | Ex. 19 |
|---|---|---|---|---|
| PVC 1 | 100.0 | 100.00 | 100.00 | 100.00 |
| P 1 | 24.00 | 19.00 | 14.00 | 22.00 |
| L 1 | 1.26 | 1.26 | 1.26 | 1.26 |
| St 5 | 1.90 | 1.90 | 1.90 | 1.90 |
| ESO 1 | 2.60 | 2.60 | 2.60 | 2.60 |

TABLE 5-continued

| | | | | |
|---|---|---|---|---|
| B 1 | | 5.16 | 10.32 | |
| BC 1 | | | | 2.70 |
| BC 2 | | | | |
| Surface resistance in ohms | $2.03 \times 10^{13}$ | $7.84 \times 10^{12}$ | $1.96 \times 10^{12}$ | $3.16 \times 10^{12}$ |

| | Ex. 20 | Ex. 21 | Ex. 22 |
|---|---|---|---|
| PVC 1 | 100.0 | 100.00 | 100.00 |
| P 1 | 19.00 | 16.00 | 22.00 |
| L 1 | 1.26 | 1.26 | 1.26 |
| St 5 | 1.90 | 1.90 | 1.90 |
| ESO 1 | 2.60 | 2.60 | 2.60 |
| B 1 | | | |
| BC 1 | 5.50 | 8.40 | |
| BC 2 | | | 2.70 |
| Surface resistance in ohms | $1.36 \times 10^{12}$ | $3.86 \times 10^{11}$ | $2.52 \times 10^{12}$ |

| | Ex. 23 | Ex. 24 |
|---|---|---|
| PVC 1 | 100.0 | 100.00 |
| P 1 | 19.00 | 16.00 |
| L 1 | 1.26 | 1.26 |
| St 5 | 1.90 | 1.90 |
| ESO 1 | 2.60 | 2.60 |
| B 1 | | |
| BC 1 | | |
| BC 2 | 5.50 | 8.40 |
| Surface resistance in ohms | $1.03 \times 10^{12}$ | $4.84 \times 10^{11}$ |

The following substances are employed in the above examples:

PVC 1: Evipol SH 7020 (S-PVC, K value 71)

PVC 2: E-PVC E 72 CF

P 1: Dioctyl phthalate

P 2: Phosphate plasticizer (Reofos® 50; Ciba-Geigy AG; CH)

L 1: PE wax

ESO: Epoxidized soybean oil (Reoplast 38)

ESO 1: Epoxidized soybean oil (Irgaplast 39)

ST 1: Barium/zinc stabilizer (BZ 561®; Ciba-Geigy additive; DE)

ST 2: Barium/zinc stabilizer (BZ 555®; Ciba-Geigy additive; DE)

ST 3: Calcium/zinc stabilizer (CZ 400®; Ciba-Geigy additive; DE)

ST 4: Barium/zinc stabilizer (BZ 508; Ciba-Geigy additive; DE)

ST 5: Barium/zinc stabilizer (BZ 591; Ciba-Geigy additive; DE)

B 1: Polyethylene glycol lauryl ester (mean MW 460)

B 2: Polyethylene glycol oleyl ether (principal component diethylene glycol monooleyl ether)

C 1: $NaClO_4$

C 2: $KPF_6$

C 3: $LiCF_3SO_3$

C 4: $KCF_3SO_3$

C 5: $LiClO_4$

BC 1: 8% solution of $KPF_6$ in B 1

BC 2: 25% solution of $NaClO_4$ in B 1

What is claimed is:

1. A composition consisting essentially of
   (a) a halogen-containing polymer;
   (b) a polyoxyalkylene of the formula $R_1$—O—[CH($R_3$)—$CH_2$—O—]$_n$—[$CH_2$—[CH(OH)]$_p$—$CH_2$—O]$_q$—[C(O)]$_r$—$R_2$, where $R_1$ is hydrogen, $C_1$-$C_{24}$ alkyl, $C_2$-$C_{24}$ alkenyl, $CH_2$=CH—C(O) or $CH_2$=$CCH_3$—C(O); $R_2$ is $C_1$-$C_{24}$ alkyl, $C_2$-$C_{24}$ alkenyl or $CH_2$—COOH; $R_3$ is hydrogen or methyl; n is a number equal to or greater than 2; p is a number from 1 to 6; and q and r, independently of one another, are 0 or 1; and
   (c) an inorganic salt of the formula $\{M^{z+}{}_a A^{(az/b)-}{}_b\}$, where M is a z-valent alkali metal cation, alkaline earth metal cation or a zinc cation; a and b, independently of one another, are a number from 1 to 6; and A is an anion of an inorganic oxo acid, an inorganic complex acid or an organic oxo acid of sulfur;
with the proviso that no ammonium perchlorate is present.

2. A process for the preparation of an antistatic halogen-containing polymer composition which comprises mixing a halogen-containing polymer and an additive mixture consisting essentially of a polyoxyalkylene of the formula $R_1$—O—[CH($R_3$)—$CH_2$—O—]$_n$—[$CH_2$—[CH(OH)]$_p$—$CH_2$—O]$_q$—[C(O)]$_r$—$R_2$, where $R_1$ is hydrogen, $C_1$-$C_{24}$ alkyl, $C_2$-$C_{24}$ alkenyl, $CH_2$=CH—C(O) or $CH_2$=$CCH_3$—C(O); $R_2$ is $C_1$-$C_{24}$ alkyl, $C_2$-$C_{24}$ alkenyl or $CH_2$—COOH; $R_3$ is hydrogen or methyl; n is a number equal to or greater than 2; p is a number from 1 to 6; and q and r, independently of one another, are 0 or 1; and an organic salt of the formula $\{M^{z+}{}_a A^{(az/b)-}{}_b\}$, where M is a z-valent alkali metal cation, an alkaline earth metal cation or a zinc cation; a and b, independently of one another, are a number from 1 to 6; and A is an anion of an inorganic oxo acid, an anion of an inorganic complex acid or an anion of an organic oxo acid of sulfur, with the proviso that no ammonium perchlorate is present.

3. A process in accordance with claim 2 wherein said mixing step is provided by a calender, a mixer, a compounder or an extruder.

4. A composition according to claim 1, wherein component (a) is flexible PVC.

5. A composition according to claim 1, wherein component (b) is a polyethylene glycol lauryl ester.

6. A composition according to claim 1, wherein the inorganic salt (c) is $NaClO_4$ or $KPF_6$.

7. A composition according to claim 1, which additionally comprises an inorganic or organic zinc, barium, lead, cadmium, aluminium, calcium, magnesium or rare-earth compound or a mixture of at least two of these compounds.

8. A composition according to claim 1, which additionally comprises a tin compound.

9. A composition according to claim 1, which additionally comprises a phenolic antioxidant, in particular from 0.1 to 5.0 parts per 100 parts of polymer.

10. A composition according to claim 1, which additionally comprises a 1,3-diketone and/or a barium, magnesium, calcium, aluminium or zinc salt thereof, or a 1,3-keto ester.

11. A composition according to claim 1, which additionally comprises an epoxide.

12. A composition according to claim 1, which additionally comprises a monomeric, oligomeric or polymeric dihydropyridine.

13. A composition according to claim 1, which additionally comprises a phosphite, a polyol, a hydrotalcite, a zeolite, a dawsonite, a magadiite, a kenyaite or a kanemite.

14. A composition according to claim 1, which additionally comprises an inorganic or organic zinc, barium, cadmium, aluminium, calcium, magnesium or rare-earth compound or a mixture of at least two of these compounds, a 1,3-diketone and/or a barium, magnesium, calcium, aluminium or zinc salt thereof, or a 1,3-keto ester and a monomeric, oligomeric or polymeric dihydropyridine.

15. A composition according to claim 1, which additionally comprises an inorganic or organic zinc, barium, cadmium, aluminium, calcium, magnesium or rare-earth compound or a mixture of at least two of these compounds, a 1,3-diketone and/or a barium, magnesium, calcium, aluminium or zinc salt thereof, or a 1,3-keto ester, a monomeric, oligomeric or polymeric dihydropyridine and a tin compound.

16. A composition according to claim 1, which additionally comprises an inorganic or organic zinc, barium, cadmium, aluminium, calcium, magnesium or rare-earth compound or a mixture of at least two of these compounds, a 1,3-diketone and/or a barium, magnesium, calcium, aluminium or zinc salt thereof, or a 1,3-keto ester and a polyol, a hydrotalcite, a zeolite, a dawsonite, a magadiite, a kenyaite or a kanemite.

* * * * *